US012216190B2

(12) United States Patent
Hu et al.

(10) Patent No.: US 12,216,190 B2
(45) Date of Patent: Feb. 4, 2025

(54) METHOD, APPARATUS, AND SYSTEM FOR WIRELESS SENSING BASED ON LINKWISE MOTION STATISTICS

(71) Applicants: Yuqian Hu, College Park, MD (US); Beibei Wang, Clarksville, MD (US); Sai Deepika Regani, Hyattsville, MD (US); Peng Zan, Gaithersburg, MD (US); Chenshu Wu, Hong Kong (CN); Dan Bugos, Baltimore, MD (US); Xiaolu Zeng, Beijing (CN); Hung-Quoc Duc Lai, Parkville, MD (US); K. J. Ray Liu, Potomac, MD (US); Oscar Chi-Lim Au, San Jose, CA (US)

(72) Inventors: Yuqian Hu, College Park, MD (US); Beibei Wang, Clarksville, MD (US); Sai Deepika Regani, Hyattsville, MD (US); Peng Zan, Gaithersburg, MD (US); Chenshu Wu, Hong Kong (CN); Dan Bugos, Baltimore, MD (US); Xiaolu Zeng, Beijing (CN); Hung-Quoc Duc Lai, Parkville, MD (US); K. J. Ray Liu, Potomac, MD (US); Oscar Chi-Lim Au, San Jose, CA (US)

(73) Assignee: ORIGIN RESEARCH WIRELESS, INC., Rockville, MD (US)

(*) Notice: Subject to any disclaimer, the term of this patent is extended or adjusted under 35 U.S.C. 154(b) by 0 days.

(21) Appl. No.: 17/838,244

(22) Filed: Jun. 12, 2022

(65) Prior Publication Data
US 2022/0299619 A1    Sep. 22, 2022

Related U.S. Application Data

(63) Continuation-in-part of application No. 15/326,112, filed as application No. PCT/US2015/041037 on Jul.
(Continued)

(51) Int. Cl.
G01S 13/00    (2006.01)
G01S 13/56    (2006.01)

(52) U.S. Cl.
CPC ............ G01S 13/003 (2013.01); G01S 13/56 (2013.01)

(58) Field of Classification Search
CPC ................................ G01S 13/003; G01S 13/56
See application file for complete search history.

(56) References Cited

U.S. PATENT DOCUMENTS 9,304,184 B1 *  4/2016  Draganov ............... G01S 19/47
10,852,411 B2 * 12/2020  Kravets ................... G01S 13/56
(Continued)

FOREIGN PATENT DOCUMENTS

EP    3695783 A1 *  8/2020  ........... A61B 5/0022

OTHER PUBLICATIONS

Joshi et al., "WiDeo: Fine-grained Device-free Motion Tracing using RF Backscatter", 2015, USENIX Association, pp. 189-204 (Year: 2015).*

Primary Examiner — Zhiyu Lu

(57) ABSTRACT

Methods, apparatus and systems for wireless sensing based on linkwise motion statistics (link-MS) are described. In one example, a described method comprises: determining a plurality of heterogeneous wireless devices of a wireless sensing system in a venue; determining a plurality of device-links each of comprises two of the heterogeneous wireless devices, one functioning as a transmitter and the other
(Continued)

functioning as a receiver; for each respective device-link of the plurality of device-links, transmitting a respective wireless signal from a respective transmitter of the respective device-link through a wireless multipath channel of the venue, wherein the wireless multipath channel is impacted by a motion of an object in the venue, receiving the respective wireless signal by a respective receiver of the respective device-link through the wireless multipath channel, wherein the respective received wireless signal differs from the respective transmitted wireless signal due to the wireless multipath channel of the venue and the motion of the object, obtaining a respective time series of channel information (TSCI) of the wireless multipath channel based on the respective received wireless signal of the respective device-link, computing a respective link-MS for the respective device-link based on the respective TSCI; performing a sensing task associated with the motion of the object based on at least one of: all the TSCI or all the link-MS; and computing a location in the venue associated with the sensing task based on all the link-MS.

22 Claims, 23 Drawing Sheets

Related U.S. Application Data 17, 2015, application No. 17/838,244, filed on Jun. 12, 2022 is a continuation-in-part of application No. 16/127,151, filed on Sep. 10, 2018, now Pat. No. 11,012,285, which is a continuation-in-part of application No. PCT/US2017/021963, filed on Mar. 10, 2017, application No. 17/838,244, filed on Jun. 12, 2022 is a continuation-in-part of application No. 16/790,610, filed on Feb. 13, 2020, and a continuation-in-part of application No. 16/790,627, filed on Feb. 13, 2020, now Pat. No. 11,397,258, and a continuation-in-part of application No. 16/871,000, filed on May 10, 2020, and a continuation-in-part of application No. 16/871,004, filed on May 10, 2020, and a continuation-in-part of application No. 16/871,006, filed on May 10, 2020, now Pat. No. 11,408,978, and a continuation-in-part of application No. 16/909,913, filed on Jun. 23, 2020, and a continuation-in-part of application No. 16/909,940, filed on Jun. 23, 2020, now Pat. No. 11,391,830, and a continuation-in-part of application No. 16/945,827, filed on Aug. 1, 2020, and a continuation-in-part of application No. 16/945,837, filed on Aug. 1, 2020, and a continuation-in-part of application No. 17/019,270, filed on Sep. 13, 2020, and a continuation-in-part of application No. 17/113,023, filed on Dec. 5, 2020, and a continuation-in-part of application No. 17/149,625, filed on Jan. 14, 2021, and a continuation-in-part of application No. 17/149,667, filed on Jan. 14, 2021, and a continuation-in-part of application No. 17/180,763, filed on Feb. 20, 2021, and a continuation-in-part of application No. 17/180,762, filed on Feb. 20, 2021, and a continuation-in-part of application No. 17/180,760, filed on Feb. 20, 2021, now Pat. No. 11,181,486, and a continuation-in-part of application No. 17/180,766, filed on Feb. 20, 2021, and a continuation-in-part of application No. 17/214,841, filed on Mar. 27, 2021, which is a continuation-in-part of application No. 16/667,648, filed on Oct. 29, 2019, now Pat. No. 11,035,940, which is a continuation-in-part of application No. 16/446,589, filed on Jun. 19, 2019, now Pat. No. 10,742,475, which is a continuation-in-part of application No. 16/101,444, filed on Aug. 11, 2018, now Pat. No. 10,291,460, application No. 17/838,244, filed on Jun. 12, 2022 is a continuation-in-part of application No. 17/214,836, filed on Mar. 27, 2021, and a continuation-in-part of application No. 17/352,185, filed on Jun. 18, 2021, and a continuation-in-part of application No. 17/352,306, filed on Jun. 20, 2021, and a continuation-in-part of application No. 17/492,599, filed on Oct. 2, 2021, and a continuation-in-part of application No. 17/492,598, filed on Oct. 2, 2021, and a continuation-in-part of application No. 17/537,432, filed on Nov. 29, 2021, and a continuation-in-part of application No. 17/539,058, filed on Nov. 30, 2021, and a continuation-in-part of application No. 17/540,156, filed on Dec. 1, 2021, and a continuation-in-part of application No. 17/827,902, filed on May 30, 2022, and a continuation-in-part of application No. 17/492,642, filed on Oct. 3, 2021.

(60) Provisional application No. 63/209,907, filed on Jun. 11, 2021, provisional application No. 63/235,103, filed on Aug. 19, 2021, provisional application No. 63/253,083, filed on Oct. 6, 2021, provisional application No. 63/276,652, filed on Nov. 7, 2021, provisional application No. 63/281,043, filed on Nov. 18, 2021, provisional application No. 63/293,065, filed on Dec. 22, 2021, provisional application No. 63/300,432, filed on Jan. 18, 2022, provisional application No. 63/308,927, filed on Feb. 10, 2022, provisional application No. 63/332,658, filed on Apr. 19, 2022, provisional application No. 63/349,082, filed on Jun. 4, 2022.

(56) References Cited

U.S. PATENT DOCUMENTS

| | | | |
|---|---|---|---|
| 2004/0192239 A1* | 9/2004 | Nakao | H04W 52/42 455/136 |
| 2009/0102654 A1* | 4/2009 | Schoettle | G08B 13/2491 340/552 |
| 2012/0001875 A1* | 1/2012 | Li | G06F 3/017 345/177 |
| 2012/0282936 A1* | 11/2012 | Gao | H04L 5/0023 455/450 |
| 2012/0313900 A1* | 12/2012 | Dahl | G01S 5/18 345/177 |
| 2012/0319819 A1* | 12/2012 | Tkachenko | G01S 13/878 340/10.1 |
| 2013/0113647 A1* | 5/2013 | Sentelle | G01S 13/04 342/22 |
| 2017/0090026 A1* | 3/2017 | Joshi | G01S 13/87 |

* cited by examiner

|  | Ground truth | Room1 | Room1 | Room2 | Room2 | Room3 | Room3 |
|---|---|---|---|---|---|---|---|
| Single-way | Set 1 | 0.056s | -5.252s | 0.876s | 0.540s | 4.400s | 4.298s |
| | Set 2 | -1.944s | -5.752s | 2.876s | 0.540s | 4.400s | 2.798s |
| | Set 3 | -3.444s | -8.252s | 4.876s | 4.040s | 2.900s | -2.202s |
| Multi-way | MS | -3.444s | -8.252s | -1.624 | -1.460s | 3.900s | 3.798s |
| | Subca Cov | 0.0560s | -4.752s | -0.624s | -1.460s | 3.900s | 3.798s |
| | Subca Corr | -3.444s | -8.252s | -0.624s | -0.960s | -2.100s | -3.202s |
| | MRC1 MS | -3.944s | -8.252s | -2.624s | -1.960s | -2.100s | -0.702s |
| | MRC2 MS | -6.444s | -11.252s | -2.624s | -3.460s | -5.600s | -6.202s |

Columns: Set 1–Set 3 = Motion statistic (MS) / Single-way; MS, Subca Cov = Motion statistic (MS) / Multi-way; Subca Corr = Proximity statistic (PS); MRC1 MS, MRC2 MS = MRC-based MS.

FIG. 8

| structure | Set1 | Set2 | Set3 | Multi-way MS | CoV | Corr | MRC1 MS | MRC2 MS |
|---|---|---|---|---|---|---|---|---|
| Overlap ratio | 0.74512 | 0.76707 | 0.68659 | 0.78415 | 0.89756 | 0.71707 | 0.7561 | 0.69024 |
| structure | Set1 | Set2 | Set3 | Multi-way MS | CoV | Corr | MRC1 MS | MRC2 MS |
| Detected ratio | 0.94673 | 0.93705 | 0.9201 | 0.93947 | 0.92736 | 1 | 0.94915 | 0.95884 |
| structure | Set1 | Set2 | Set3 | Multi-way MS | CoV | Corr | MRC1 MS | MRC2 MS |
| False alarm ratio | 0.45946 | 0.40541 | 0.55037 | 0.37346 | 0.13268 | 0.57002 | 0.4398 | 0.58231 |

FIG. 9

| Ground truth | Room1 | Room2 | Room3 | |
|---|---|---|---|---|
| Set 1 | -0.052s | 1.999s | 1.340s | Motion statistic (MS) — Single-way |
| Set 2 | -2.052s | 1.999s | -1.160s | |
| Set 3 | -6.052s | 4.999s | -9.160s | |
| MS | -3.052s | 0.499s | -4.660s | |
| Cov | -0.052s | -0.0010s | 3.840s | Proximity statistic (PS) — Multi-way |
| Corr | -6.052s | -0.501s | -3.160s | |
| MRC1 MS | -3.052s | -0.501s | -5.660s | MRC-based MS |
| MRC2 MS | -10.052s | -2.501s | -6.160s | |

FIG. 10

| structure | Set1 | Set2 | Set3 | Multi-way MS | Cov | Corr | MRC1 MS | MRC2 MS |
|---|---|---|---|---|---|---|---|---|
| Overlap ratio | 0.74512 | 0.76707 | 0.68659 | 0.84318 | 0.92273 | 0.84091 | 0.81364 | 0.79545 |

| structure | Set1 | Set2 | Set3 | Multi-way MS | Cov | Corr | MRC1 MS | MRC2 MS |
|---|---|---|---|---|---|---|---|---|
| Detected ratio | 0.94673 | 0.93705 | 0.9201 | 0.94 | 0.95714 | 1 | 0.92571 | 0.94286 |

| structure | Set1 | Set2 | Set3 | Multi-way MS | Cov | Corr | MRC1 MS | MRC2 MS |
|---|---|---|---|---|---|---|---|---|
| False alarm ratio | 0.45946 | 0.40541 | 0.55037 | 0.53333 | 0.21111 | 0.77778 | 0.62222 | 0.77778 |

FIG. 11

METHOD, APPARATUS, AND SYSTEM FOR WIRELESS SENSING BASED ON LINKWISE MOTION STATISTICS

CROSS-REFERENCE TO RELATED APPLICATIONS

The present application is related to U.S. patent application with Ser. No. 17/838,231, entitled "METHOD, APPARATUS, AND SYSTEM FOR IDENTIFYING AND QUALIFYING DEVICES FOR WIRELESS SENSING," filed on Jun. 12, 2022, and related to U.S. patent application with Ser. No. 17/838,228, entitled "METHOD, APPARATUS, AND SYSTEM FOR WIRELESS SENSING BASED ON CHANNEL INFORMATION," filed on Jun. 12, 2022, and related to U.S. patent application with Ser. No. 17/91,037, entitled "METHOD, APPARATUS, AND SYSTEM FOR MAP RECONSTRUCTION BASED ON WIRELESS TRACKING," filed on Jun. 12, 2022, each of which is expressly incorporated by reference herein in its entirety.

The present application hereby incorporates by reference the entirety of the disclosures of, and claims priority to, each of the following cases:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/790,610, entitled "METHOD, APPARATUS, AND SYSTEM FOR WIRELESS GAIT RECOGNITION", filed Feb. 13, 2020,
(d) U.S. patent application Ser. No. 16/790,627, entitled "METHOD, APPARATUS, AND SYSTEM FOR OUTDOOR TARGET TRACKING", filed Feb. 13, 2020.
(e) U.S. patent application Ser. No. 16/871,000, entitled "METHOD, APPARATUS, AND SYSTEM FOR WIRELESS TRACKING WITH GRAPH-BASED PARTICLE FILTERING", filed on May 10, 2020,
(f) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(g) U.S. patent application Ser. No. 16/871,006, entitled "METHOD, APPARATUS, AND SYSTEM FOR VITAL SIGNS MONITORING USING HIGH FREQUENCY WIRELESS SIGNALS", filed on May 10, 2020,
(h) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
(i) U.S. patent application Ser. No. 16/909,940, entitled "METHOD, APPARATUS, AND SYSTEM FOR QUALIFIED WIRELESS SENSING", filed on Jun. 23, 2020,
(j) U.S. patent application Ser. No. 16/945,827, entitled "METHOD, APPARATUS, AND SYSTEM FOR PROCESSING AND PRESENTING LIFE LOG BASED ON A WIRELESS SIGNAL", filed on Aug. 1, 2020,
(k) U.S. patent application Ser. No. 16/945,837, entitled "METHOD, APPARATUS, AND SYSTEM FOR WIRELESS SLEEP MONITORING", filed on Aug. 1, 2020,
(l) U.S. patent application Ser. No. 17/019,270, entitled "METHOD, APPARATUS, AND SYSTEM FOR VEHICLE WIRELESS MONITORING", filed on Sep. 13, 2020,
(m) U.S. patent application Ser. No. 17/113,023, entitled "METHOD, APPARATUS, AND SYSTEM FOR ACCURATE WIRELESS MONITORING", filed on Dec. 5, 2020,
(n) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
(o) U.S. patent application Ser. No. 17/149,667, entitled "METHOD, APPARATUS, AND SYSTEM FOR WIRELESS MONITORING WITH FLEXIBLE POWER SUPPLY", filed on Jan. 14, 2021,
(p) U.S. patent application Ser. No. 17/180,763, entitled "METHOD, APPARATUS, AND SYSTEM FOR WIRELESS WRITING TRACKING", filed on Feb. 20, 2021,
(q) U.S. patent application Ser. No. 17/180,762, entitled "METHOD, APPARATUS, AND SYSTEM FOR FALL-DOWN DETECTION BASED ON A WIRELESS SIGNAL", filed on Feb. 20, 2021,
(r) U.S. patent application Ser. No. 17/180,760, entitled "METHOD, APPARATUS, AND SYSTEM FOR WIRELESS MATERIAL SENSING", filed on Feb. 20, 2021,
(s) U.S. patent application Ser. No. 17/180,766, entitled "METHOD, APPARATUS, AND SYSTEM FOR WIRELESS MOTION RECOGNITION", filed on Feb. 20, 2021,
(t) U.S. patent application Ser. No. 17/214,841, entitled "METHOD, APPARATUS, AND SYSTEM FOR WIRELESS PROXIMITY SENSING", filed on Mar. 27, 2021,
  (1) which is a Continuation-in-Part of U.S. patent application Ser. No. 16/667,648, entitled "METHOD, APPARATUS, AND SYSTEM FOR WIRELESS PROXIMITY AND PRESENCE MONITORING", filed on Oct. 29, 2019, issued as U.S. patent 11,035,940 on Jun. 15, 2021,
    a. which is a Continuation-in-Part of U.S. patent application Ser. No. 16/446,589, entitled "METHOD, APPARATUS, AND SYSTEM FOR OBJECT TRACKING AND SENSING USING BROADCASTING", filed Jun. 19, 2019, issued as U.S. Pat. No. 10,742,475 on Aug. 11, 2020,
      1. which is a Continuation-in-Part of U.S. patent application Ser. No. 16/101,444, entitled "METHOD, APPARATUS, AND SYSTEM FOR WIRELESS MOTION MONITORING", filed on Aug. 11, 2018, issued as U.S. Pat. No. 10,291,460 on May 14, 2019, (u) U.S. patent application Ser. No. 17/214,836, entitled "METHOD, APPARATUS, AND SYSTEM FOR WIRELESSLY TRACKING KEYSTROKES", filed on Mar. 27, 2021, (v) U.S. Provisional Patent application 63/209,907, entitled "METHOD, APPARATUS, AND SYSTEM FOR WIRELESS MOTION AND SOUND SENSING", filed on Jun. 11, 2021, (w) U.S. patent application Ser. No. 17/352,185, entitled "METHOD, APPARATUS, AND SYSTEM FOR WIRELESS MICRO MOTION MONITORING", filed on Jun. 18, 2021, (x) U.S. patent application Ser. No. 17/352,306, entitled "METHOD, APPARATUS, AND SYSTEM FOR WIRELESS MONITORING TO ENSURE SECURITY", filed on June 20, 2021, (y) U.S. Provisional Patent application 63/235,103, entitled "METHOD, APPARATUS, AND SYSTEM FOR NAMING IOT DEVICES FOR WIRELESS SENSING", filed on Aug. 19, 2021, (z) U.S. Provisional Patent application 63/253,083, entitled "METHOD, APPARATUS, AND SYSTEM FOR WIRELESS SENSING, DETECTION AND TRACKING", filed on Oct. 6, 2021, (aa) U.S. patent application Ser. No. 17/492,599, entitled "METHOD, APPARATUS, AND SYSTEM FOR HUMAN RECOGNITION BASED ON GAIT FEATURES", filed on Oct. 2, 2021, (bb) U.S. patent application Ser. No. 17/492,598, entitled "METHOD, APPARATUS, AND SYSTEM FOR SOUND SENSING BASED ON WIRELESS SIGNALS", filed on Oct. 2, 2021, (cc) U.S. Provisional Patent application 63/276,652, entitled "METHOD, APPARATUS, AND SYSTEM FOR WIRELESSLY MONITORING VITAL SIGN AND PERIODIC MOTIONS", filed on Nov. 7, 2021, (dd) U.S. Provisional Patent application 63/281,043, entitled "METHOD, APPARATUS, AND SYSTEM FOR SENSING", filed on Nov. 18, 2021, (ee) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021, (ff) U.S. patent application Ser. No. 17/539,058, entitled "METHOD, APPARATUS, AND SYSTEM FOR HUMAN IDENTIFIATION BASED ON HUMAN RADIO BIOMETRIC INFORMATION", filed on Nov. 30, 2021, (gg) U.S. patent application Ser. No. 17/540,156, entitled "METHOD, APPARATUS, AND SYSTEM FOR POSITIONING AND POWERING A WIRELESS MONITORING SYSTEM", filed on Dec. 1, 2021, (hh) U.S. Provisional Patent application 63/293,065, entitled "METHOD, APPARATUS, AND SYSTEM FOR SPEECH ENHANCEMENT AND SEPARATION", filed on Dec. 22, 2021, (ii) U.S. Provisional Patent application 63/300,432, entitled "METHOD, APPARATUS, AND SYSTEM FOR WIRELESS SENSING AND SLEEP TRACKING", filed on Jan. 16, 2022, (jj) U.S. Provisional Patent application 63/308,927, entitled "METHOD, APPARATUS, AND SYSTEM FOR WIRELESS SENSING BASED ON MULTIPLE GROUPS OF WIRELESS DEVICES", filed on Feb. 19, 2022, (kk) U.S. Provisional Patent application 63/332,658, entitled "METHOD, APPARATUS, AND SYSTEM FOR WIRELESS SENSING", filed on Apr. 19, 2022, (ll) U.S. patent application Ser. No. 17/827,902, entitled "METHOD, APPARATUS, AND SYSTEM FOR SPEECH ENHANCEMENT AND SEPARATOIN BASED ON AUDIO AND RADIO SIGNALS", filed on May 30, 2022, (mm) U.S. Provisional Patent application 63/349,082, entitled "METHOD, APPARATUS, AND SYSTEM FOR WIRELESS SENSING VOICE ACTIVITY DETECTION", filed on Jun. 4, 2022, (nn) U.S. patent application Ser. No. 17/492,642, entitled "METHOD, APPARATUS, AND SYSTEM FOR MOVEMENT TRACKING", filed on Oct. 2, 2021.

TECHNICAL FIELD

The present teaching generally relates to wireless sensing. More specifically, the present teaching relates to wireless sensing based on linkwise motion statistics.

BACKGROUND

Object motion detection becomes more and more important nowadays. For example, for security and/or management purposes, a user may want to detect any object motion in the user's house; a manager of a supermarket may want to detect any object motion in the supermarket; and a nurse in a hospital may want to detect any motion of a patient in the hospital.

Existing systems and methods for detecting object motions cannot provide enough accuracy and often lead to false alarms. Existing approaches include those based on passive infrared (PIR), active infrared (AIR) and Ultrasonic. PIR sensors are the most widely used motion sensor in home security systems, which detect human motions by sensing the difference between background heat and the heat emitted by moving people. However, solutions based on PIR sensors are prone to false alarms due to its sensitivity to environmental changes, like hot/cold air flow and sunlight. These solutions are easily defeated by blocking the body heat emission, e.g. wearing a heat-insulating full-body suit. In addition, the solutions have limited detection ranges and need line-of-sight (LOS). In AIR based approaches, an infrared (IR) emitter sends a beam of IR which will be received by an IR receiver. When the beam is interrupted, a motion is detected. However, this kind of approaches can be easily seen as using a regular camera or any IR detection mechanism and also has limited range and thus need LOS. Ultrasonic sensors detect human motion by sending out ultrasonic sound waves into a space and measuring the speed at which they return, and motion can be detected if there are frequency changes. However, this kind of approaches can be defeated by wearing an anechoic suit. In addition, ultrasound cannot penetrate solid objects such as furniture or boxes and thus cause gaps in detection field. Furthermore, slow movements by a burglar may not trigger an alarm in an ultrasound-based detection system.

In real-world applications, it is not only the presence of motion but also where the motion happens that matters. For instance, smart home technologies can fully realize the potential energy saving for automatic control of utilities such as lighting, heating and indoor surveillance camera only at the presence of motion within a small range. Moreover, area-aware motion detection can provide important location-related context for further activity recognition of daily living. However, most existing approaches only aim at detecting motion in a pre-defined (e.g. a large building) area without investigating where (e.g. which room in the building) the target motion is. Previous approaches have also attempted to localize a human target using fingerprinting-based methods or geometric mapping-based methods. However, they usually require high setup efforts such as multiple transceivers with a specific geometric arrangement, or dedicated calibration and even training before achieving the precise localization, and therefore are not practical for motion localization.

Thus, existing systems and methods for wireless sensing and localization are not entirely satisfactory.

SUMMARY

The present teaching generally relates to wireless sensing. More specifically, the present teaching relates to wireless sensing based on linkwise motion statistics.

In one embodiment, a method of a wireless sensing system is described. The method comprises: determining a plurality of heterogeneous wireless devices of the wireless sensing system in a venue; determining a plurality of device-links each of comprises two of the heterogeneous wireless devices, wherein one of the two heterogeneous wireless devices functions as a transmitter and the other one of the two heterogeneous wireless devices functions as a receiver; for each respective device-link of the plurality of device-links, transmitting a respective wireless signal from a respective transmitter of the respective device-link through a wireless multipath channel of the venue, wherein the wireless multipath channel is impacted by a motion of an object in the venue, receiving the respective wireless signal by a respective receiver of the respective device-link through the wireless multipath channel, wherein the respective received wireless signal differs from the respective transmitted wireless signal due to the wireless multipath channel of the venue and the motion of the object, obtaining a respective time series of channel information (TSCI) of the wireless multipath channel based on the respective received wireless signal of the respective device-link, computing a respective linkwise motion statistics (link-MS) for the respective device-link based on the respective TSCI; performing a sensing task associated with the motion of the object based on at least one of: all the TSCI or all the link-MS; and computing a location in the venue associated with the sensing task based on all the link-MS.

In another embodiment, a system for wireless sensing is described. The system comprises: a plurality of heterogeneous wireless devices forming a plurality of device-links in a venue, wherein each of the plurality of device-links comprises two of the heterogeneous wireless devices, wherein one of the two heterogeneous wireless devices functions as a transmitter and the other one of the two heterogeneous wireless devices functions as a receiver; and at least one processor. For each respective device-link of the plurality of device-links: a respective transmitter of the respective device-link is configured to transmit a respective wireless signal through a wireless multipath channel of the venue, the wireless multipath channel is impacted by a motion of an object in the venue, a respective receiver of the respective device-link is configured to receive the respective wireless signal through the wireless multipath channel, the respective received wireless signal differs from the respective transmitted wireless signal due to the wireless multipath channel of the venue and the motion of the object, and the at least one processor is configured to obtain a respective time series of channel information (TSCI) of the wireless multipath channel based on the respective received wireless signal of the respective device-link, and to compute a respective linkwise motion statistics (link-MS) for the respective device-link based on the respective TSCI. The at least one processor is further configured for: performing a sensing task associated with the motion of the object based on at least one of: all the TSCI or all the link-MS, and computing a location in the venue associated with the sensing task based on all the link-MS.

Other concepts relate to software for implementing the present teaching on wireless sensing based on linkwise motion statistics. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 8 illustrates an exemplary performance of response time for wireless sensing based on repetition test, according to some embodiments of the present disclosure.

FIG. 9 illustrates an exemplary performance of various ratios for wireless sensing based on repetition test, according to some embodiments of the present disclosure.

FIG. 10 illustrates an exemplary performance of response time for wireless sensing based on transition test, according to some embodiments of the present disclosure.

FIG. 11 illustrates an exemplary performance of various ratios for wireless sensing based on transition test, according to some embodiments of the present disclosure.

DETAILED DESCRIPTION

Figure 1A:
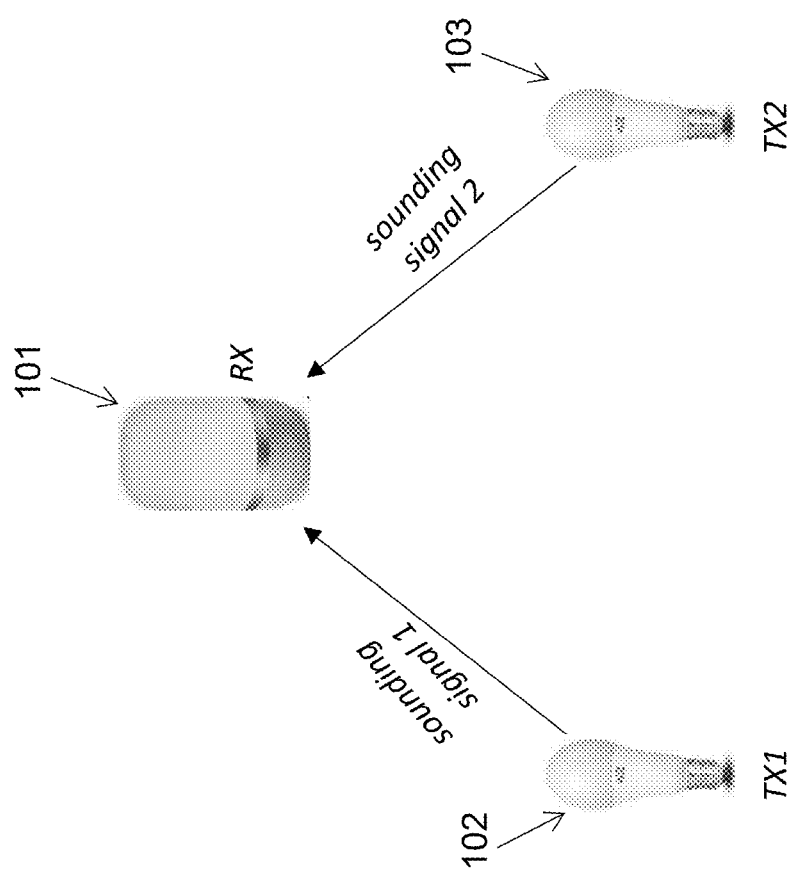
FIG. 1A and FIG. 1B illustrate an exemplary single-way structure for wireless sensing, according to some embodiments of the present disclosure.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a re-training, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated.

There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object.

The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.).

For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time Ti and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X−Y), (Y−X), abs(X−Y), $X^a$, $Y^b$, abs($X^a-Y^b$), $(X-Y)^a$, (X/Y), (X+a)/(Y+b), ($X^a/Y^b$), and $((X/Y)^a-b)$, wherein a and b are may be some predetermined quantities. For example, the function may simply be abs(X−Y), or $(X-Y)^2$, $(X-Y)^4$. The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X=($x_1$, $x_2$, ..., $x_n$) and Y=($y_1$, $y_2$, ..., $y_n$). The function may be a function of at least one of: $x_i$, $y_i$, ($x_i-y_i$), ($y_i-x_i$), abs($x_i-y_i$), $x_i^a$, $y_i^b$, abs($x_i^a-y_i^b$), $(x_i-y_i)^a$, ($x_i/y_i$), ($x_i+a$)/($y_i+b$), ($x_i^a/y_i^b$), and $((x_i/y_i)^a-b)$, wherein i is a component index of the n-tuple X and Y, and $1<=i<=n$, e.g. component index of $x_1$ is i=1, component index of $x_2$ is i=2. The function may comprise a component-by-component summation of another function of at least one of the following: $x_i$, $y_i$, ($x_i-y_i$), ($y_i-x_i$), abs($x_i-y_i$), $x_i^a$, $y_i^b$, abs($x_i^a-y_i^b$), $(x_i-y_i)^a$, ($x_i/y_i$), ($x_i+a$)/($y_i+b$), ($x_i^a/y_i^b$), and $((x\_i/y\_i)^a-b)$, wherein i is the component index of the n-tuple X and Y. For example, the function may be in a form of sum $\{i=1\}^n$ (abs($x\_i/y\_i$)−1)/n, or sum $\{i=1\}^n$ w $i$*(abs ($x\_i/y\_i$)−1), where $w\_i$ is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i^{\{th\}}$ domain item is mapped to the $j^{\{th\}}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier.

The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

Channel/channel information/venue/spatial-temporal info/motion/object

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information (including feedback or steering matrices generated by wireless communication devices, according to a standardized process, e.g., IEEE 802.11 or another standard), transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device.

Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, $L\_1$ norm, $L\_2$ norm, $L\_k$ norm for $k>2$, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car).

The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, post-processing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.).

The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Washington. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that the disclosed wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface(UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

Type 1 device (transmitter, or Tx) and Type 2 device (receiver, or Rx) may be on same device (e.g. RF chip/IC) or simply the same device. The devices may operate at high frequency band, such as 28 GHz, 60 GHz, 77 GHz, etc. The RF chip may have dedicated Tx antennas (e.g. 32 antennas) and dedicated Rx antennas (e.g. another 32 antennas).

One Tx antenna may transmit a wireless signal (e.g. a series of probe signal, perhaps at 100 Hz). Alternatively, all Tx antennas may be used to transmit the wireless signal with beamforming (in Tx), such that the wireless signal is focused in certain direction (e.g. for energy efficiency or boosting the signal to noise ratio in that direction, or low power operation when "scanning" that direction, or low power operation if object is known to be in that direction).

The wireless signal hits an object (e.g. a living human lying on a bed 4 feet away from the Tx/Rx antennas, with breathing and heart beat) in a venue (e.g. a room). The object motion (e.g. lung movement according to breathing rate, or blood-vessel movement according to heart beat) may impact/modulate the wireless signal. All Rx antennas may be used to receive the wireless signal.

Beamforming (in Rx and/or Tx) may be applied (digitally) to "scan" different directions. Many directions can be scanned or monitored simultaneously. With beamforming, "sectors" (e.g. directions, orientations, bearings, zones, regions, segments) may be defined related to the Type 2 device (e.g. relative to center location of antenna array). For each probe signal (e.g. a pulse, an ACK, a control packet, etc.), a channel information or CI (e.g. channel impulse response/CIR, CSI, CFR) is obtained/computed for each sector (e.g. from the RF chip). In breathing detection, one may collect CIR in a sliding window (e.g. 30 sec, and with 100 Hz sounding/probing rate, one may have 3000 CIR over 30 sec).

The CIR may have many taps (e.g. N1 components/taps). Each tap may be associated with a time lag, or a time-of-flight (tof, e.g. time to hit the human 4 feet away and back). When a person is breathing in a certain direction at a certain distance (e.g. 4 ft), one may search for the CIR in the "certain direction". Then one may search for the tap corresponding to the "certain distance". Then one may compute the breathing rate and heart rate from that tap of that CIR.

One may consider each tap in the sliding window (e.g. 30 second window of "component time series") as a time function (e.g. a "tap function", the "component time series"). One may examine each tap function in search of a strong periodic behavior (e.g. corresponds to breathing, perhaps in the range of 10 bpm to 40 bpm).

The Type 1 device and/or the Type 2 device may have external connections/links and/or internal connections/links. The external connections (e.g. connection 1110) may be associated with 2G/2.5G/3G/3.5G/4G/LTE/5G/6G/7G/NBIoT, UWB, WiMax, Zigbee, 802.16 etc. The internal connections (e.g., 1114A and 1114B, 1116, 1118, 1120) may be associated with WiFi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/ standard.

The Type 1 device and/or Type 2 device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiMH battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, invertor, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bulldozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc.), the Type 1 device and/or Type 2 device may be an embedded device embedded in the vehicle, or an add-on device (e.g. aftermarket device) plugged into a port in the vehicle (e.g. OBD port/socket, USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle). The two devices may jointly monitor the passengers including children/babies in the car. They may be used to count the passengers, recognize the driver, detect presence of passenger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, parking ticket, golf cart, bicycle, smart phone, tablet, camera, recording device, smart watch, roller skate, shoes, jackets, goggle, hat, eye-wear, wearable, Segway, scooter, luggage tag, cleaning machine, vacuum cleaner, pet tag/collar/wearable/implant), each device either plugged into 12V accessory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-storey parking facility, scattered locations to cover a big area such as factory/stadium/train station/shopping mall/construction site. The Type A device may be located, tracked or monitored based on the TSCI.

The area/venue may have no local connectivity, e.g., broadband services, WiFi, etc. The Type 1 and/or Type 2 device may be portable. The Type 1 and/or Type 2 device may support plug and play.

Pairwise wireless links may be established between many pairs of devices, forming the tree structure. In each pair (and the associated link), a device (second device) may be a non-leaf (Type B). The other device (first device) may be a leaf (Type A or Type B) or non-leaf (Type B). In the link, the first device functions as a bot (Type 1 device or a Tx device) to send a wireless signal (e.g. probe signal) through the wireless multipath channel to the second device. The second device may function as an Origin (Type 2 device or Rx device) to receive the wireless signal, obtain the TSCI and compute a "linkwise analytics" based on the TSCI.

In some embodiments, the present teaching discloses a wireless sensing system monitoring a motion of an object in a venue. The system may be performing one or more wireless sensing tasks, such as motion detection, presence detection, motion localization, breathing detection, sleep monitoring, fall-down detection, people recognition, gait detection, people counting, activity of daily living (ADL) monitoring, etc. In some embodiments, the present teaching discloses motion localization which may be a standalone wireless sensing task. It may also be a companion wireless sensing task performed in conjunction with another task (e.g. motion detection). For example, when motion is detected in the venue, the motion localization may be performed to detect that the motion is detected in the living room in the venue.

Figure 1B:
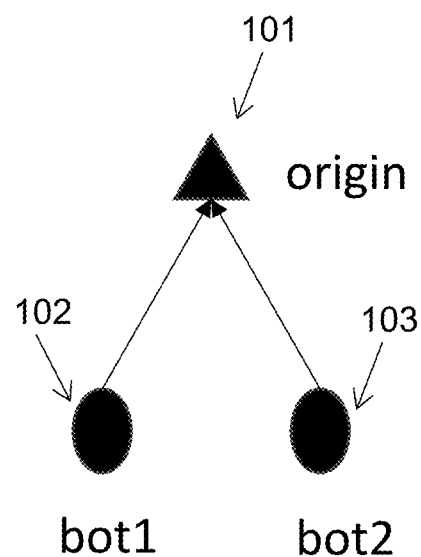

FIG. 1A and FIG. 1B illustrate an exemplary single-way structure for wireless sensing, according to some embodiments of the present disclosure. FIG. 1B is a diagram representation of devices in FIG. 1A. As shown in FIG. 1A and FIG. 1B, a desk lamp 101 may be a superbulb acting as an Origin (RX); and there are two Bots 102, 103, where each Bot (TX) may be a regular bulb. In some embodiments, each TX 102, 103 can broadcast a sounding signal with a specific CSI rate. That is, the sounding signal 1 transmitted by TX1 102 and the sounding signal 2 transmitted by TX2 103 may be associated with different CSI rates.

In some embodiments, WiFi carrier-sense multiple access (CSMA) is used to schedule the transmission for each TX. After the Origin 101 receives CSI, it can calculate motion statistics (MS) for TX and determine if a bulb (TX1 or TX2) should be turned on or off.

Figure 2:
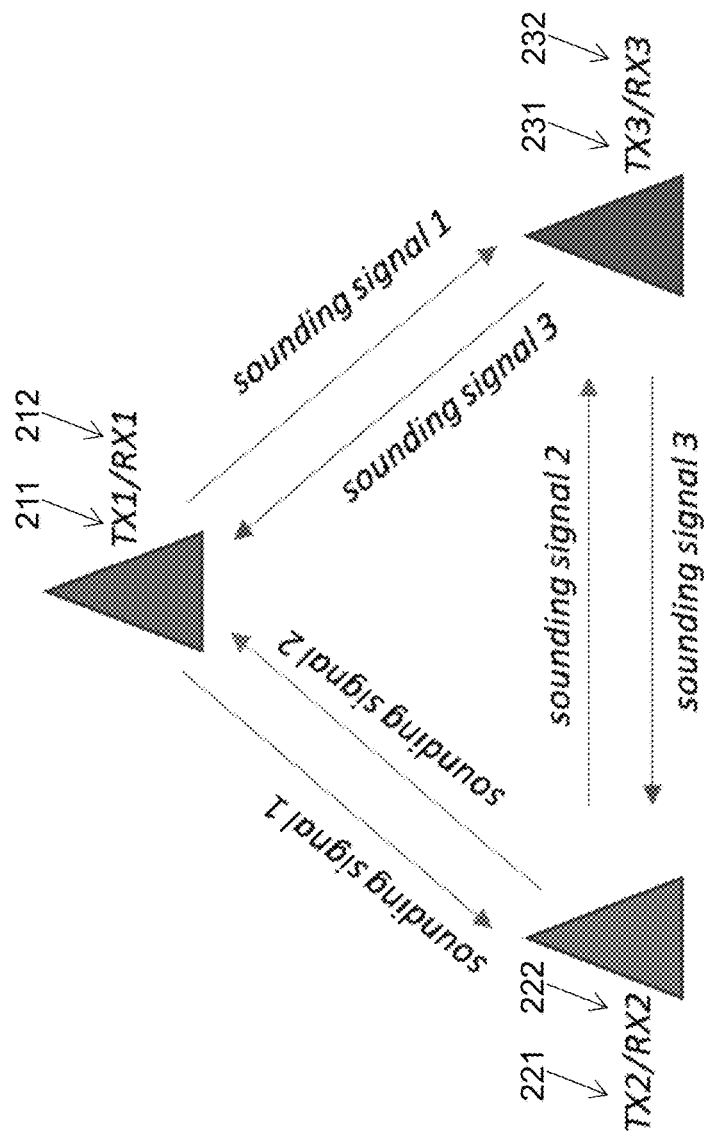
FIG. 2 illustrates an exemplary multi-way structure for wireless sensing, according to some embodiments of the present disclosure.

FIG. 2 illustrates an exemplary multi-way structure for wireless sensing, according to some embodiments of the present disclosure. In some embodiments, all devices in the sensing network of FIG. 2 are identical in terms of sensing. Each device can broadcast a sounding signal with a specific CSI rate and obtain CSI from other devices. WiFi CSMA may be used to schedule the transmission for each TX. Each device can calculate the sensing data (e.g. motion statistics) for the links between itself and other devices. In the diagram shown in FIG. 2, there are three locations 1, 2, 3. Accordingly, each location has a respective transmitter (TX) and a respective receiver (RX). For example, TX1 211 is at location 1 and can broadcast a sounding signal 1 to locations 2 and 3; TX2 221 is at location 2 and can broadcast a sounding signal 2 to locations 1 and 2; TX3 231 is at location 3 and can broadcast a sounding signal 3 to locations 1 and 2. At receiver side, RX1 212 is at location 1 and can receive sounding signals 2 and 3 from locations 2 and 3; RX2 222 is at location 2 and can receive sounding signals 1 and 3 from locations 1 and 3; RX3 232 is at location 3 and can receive sounding signals 1 and 2 from locations 1 and 2. Based on the wireless sounding signals, the system can have various motion statistics (ms): ms12, ms13, ms21, ms23, ms31, ms32, where msXY represents ms based on sounding signal transmitted from location X to location Y. In some embodiments, all sensing data (i.e. motion statistics) are sent back to a common node for further analysis to determine motion location. In some embodiments, the TX and the RX at a same location can be physically coupled to a same device, to form a transceiver. In other embodiments, the TX and the RX at a same location can be located at two separate devices.

Figure 3:
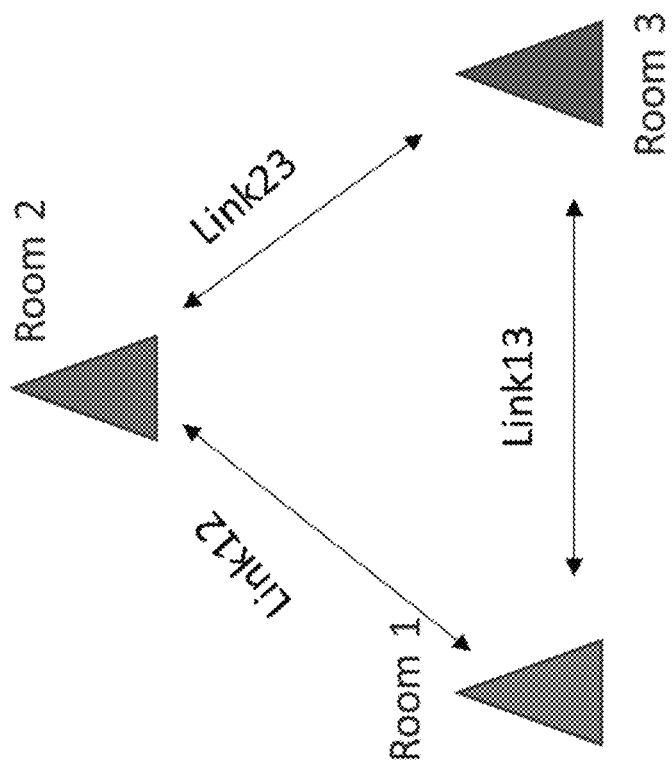
FIG. 3 illustrates an exemplary diagram showing a setup for multi-way sensing, according to some embodiments of the present disclosure.

FIG. 3 illustrates an exemplary diagram showing a setup for multi-way sensing, e.g. the multi-way sensing as shown in FIG. 2. As shown in FIG. 3, the three locations 1, 2, 3 can be three rooms 1, 2, 3 of a same building. A link (device link or wireless link) is established between each pair of rooms. For example, a link12 is established between room 1 and room 2; a link23 is established between room 2 and room 3; a link13 is established between room 1 and room 3.

Figure 4:
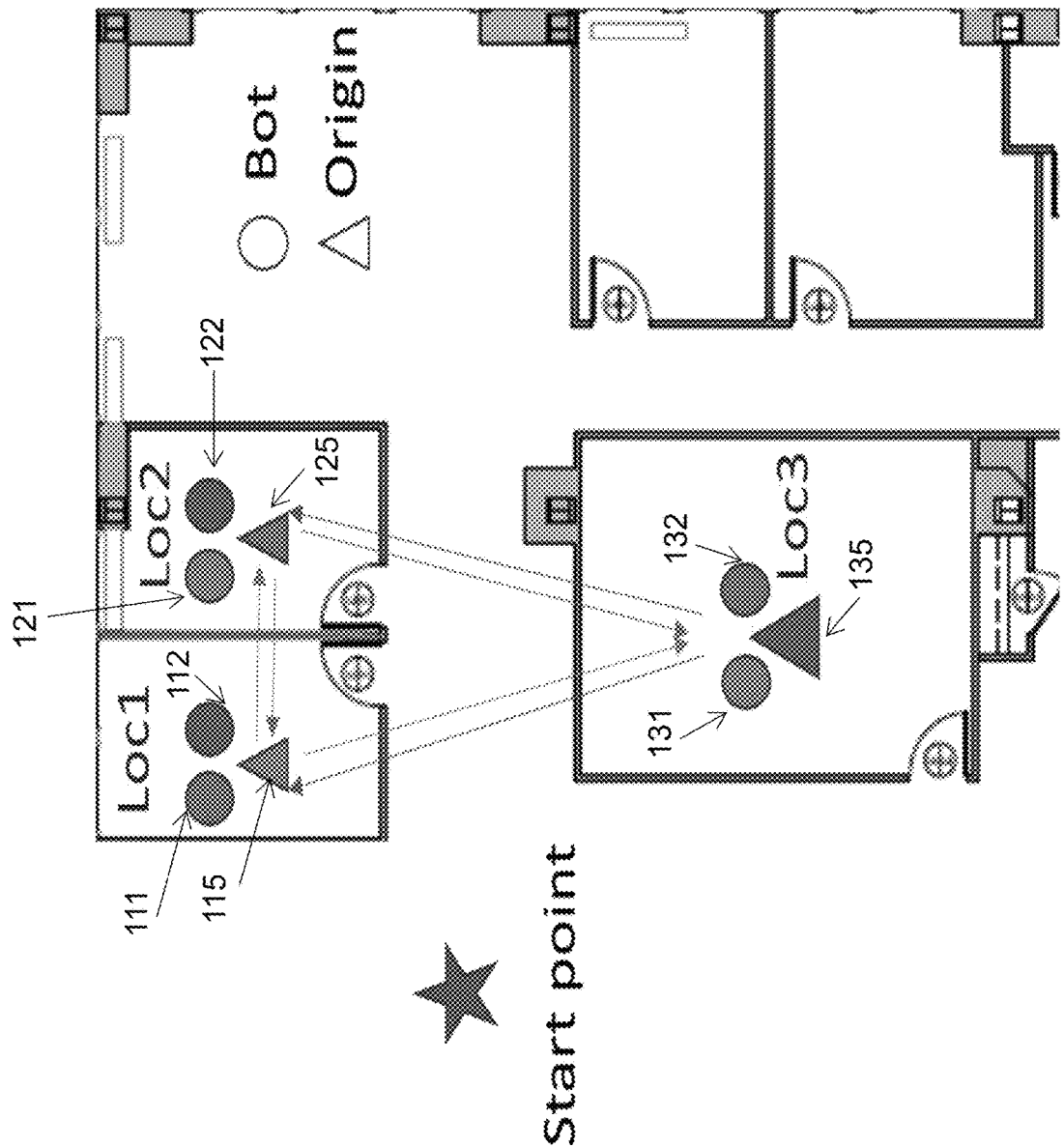
FIG. 4 illustrates an exemplary room setup for multi-way sensing, according to some embodiments of the present disclosure.

FIG. 4 illustrates an exemplary room setup for multi-way sensing, according to some embodiments of the present disclosure. As shown in FIG. 4, there are three rooms (Loc1, Loc2, Loc3) deployed with sensing devices for wireless sensing. Each room has three devices, one Origin (receiver) and two Bots (transmitters). In other embodiments, the numbers of Origins and Bots may be different from FIG. 4 and can be any positive number. The multi-way sensing setup in FIG. 4 can be formed by integrating three sets of single-way sensing structures. For example, the Bot 121 at Loc2, the Bot 131 at Loc3, and the Origin 115 at Loc1 may form a first set (Set 1) of single-way sensing structure; the Bot 111 at Loc1, the Bot 132 at Loc3, and the Origin 125 at Loc2 may form a second set (Set 2) of single-way sensing structure; the Bot 112 at Loc1, the Bot 122 at Loc2, and the Origin 135 at Loc3 may form a third set (Set 3) of single-way sensing structure. In some embodiments, when Bot and Origin at a same location are integrated to a same device, a transceiver, three devices are enough to perform the multi-way sensing as shown in FIG. 4.

In some embodiments, to perform a repetition test, a user or testing object may move from a start point to room Loc1, then back to the start point, then back to room Loc1 again. The user may then move back to the start point, then move to room Loc2, back to the start point, to room Loc2 again, then back to the start point. The user may then move from the start point to room Loc3, then back to the start point, then to room Loc3 and then back to the start point. The repetition test is to mimic a real-world case that a user may enter some room and then leave that room and return to a start point without entering any adjacent room. Ideally if a user enters a room LocX, the motion statistics sensed by bots in LocX will increase, and the motion near the Origin in LocX will also lead to an increase in the motion statistics of all the bots associated with that Origin.

In some embodiments, to perform a transition test, a user or testing object may move from the start point to room Loc1, then to room Loc2, then to room Loc3, and then moving back to the start point. The transition test is to mimic a real-world case that a user may enter one room after another. Ideally, if the user moves from one room LocX to another room LocY, the motion statistics of the bots in LocX will decrease while that of the bots in LocY will increase, indicating a transition is happening.

Figure 5:
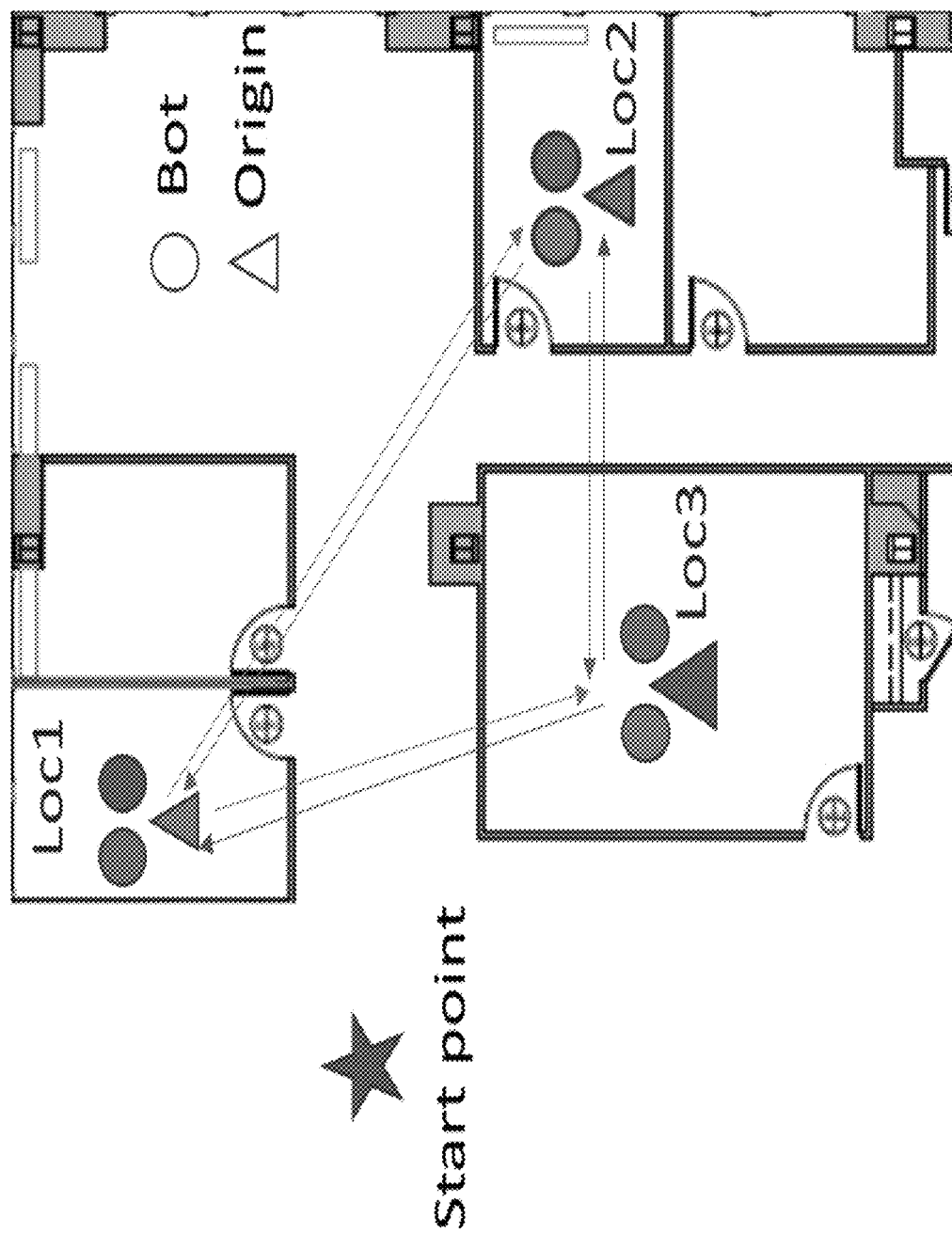
FIG. 5 illustrates another exemplary room setup for multi-way sensing, according to some embodiments of the present disclosure.

FIG. 5 illustrates another exemplary room setup for multi-way sensing, according to some embodiments of the present disclosure. As shown in FIG. 5, there are three rooms (Loc1, Loc2, Loc3) deployed with sensing devices for wireless sensing. Each room has three devices, one Origin (receiver) and two Bots (transmitters). Again, repetition test and transition test may be performed according to the setup in FIG. 5 using multi-way sensing.

Figure 6:
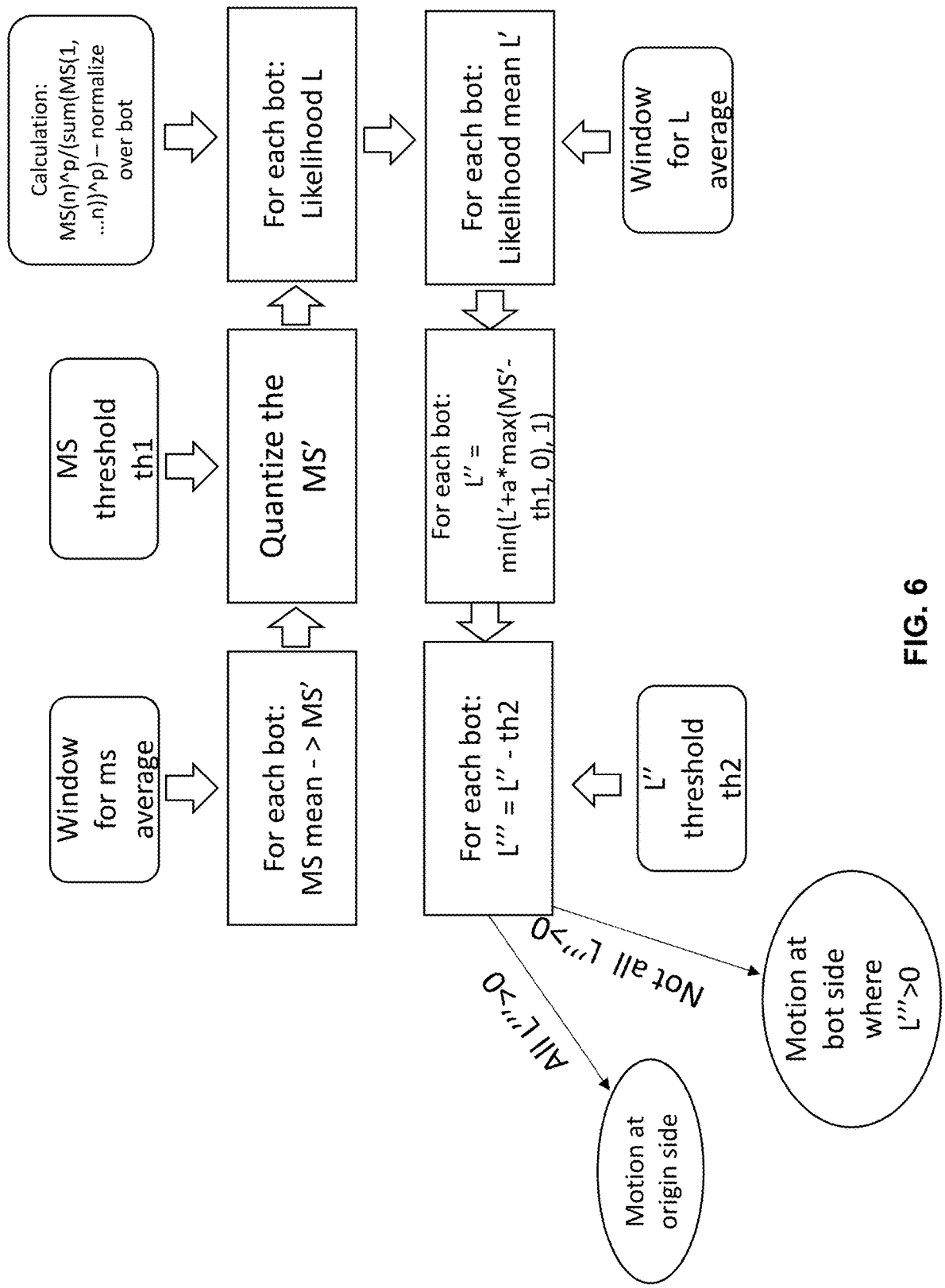
FIG. 6 illustrates an exemplary diagram showing an exemplary method for wireless sensing, according to some embodiments of the present disclosure.

FIG. 6 illustrates an exemplary diagram showing an exemplary method for wireless sensing, according to some embodiments of the present disclosure. In some embodiments, as shown in FIG. 6, the system can calculate an average motion statistics (MS') for each bot, e.g. based on a first timing window; and then quantize the MS' based on MS threshold 1 (th1). The system can then compute a likelihood L for each bot based on the quantized MS'; and then calculate an average likelihood L' for each bot based on a second timing window. Then for each bot, the system may compute L"=min (L'+a*max(MS'-th1, 0), 1), and then compute L'"=L"-th2, where th2 is a second threshold for L". In some examples, all L'" are larger than 0, then the system can determine that a motion happened at the Origin side. In other examples, not all L'" are larger than 0, then the system can determine that a motion happened at the Bot side(s) where L'">0.

Figure 7:
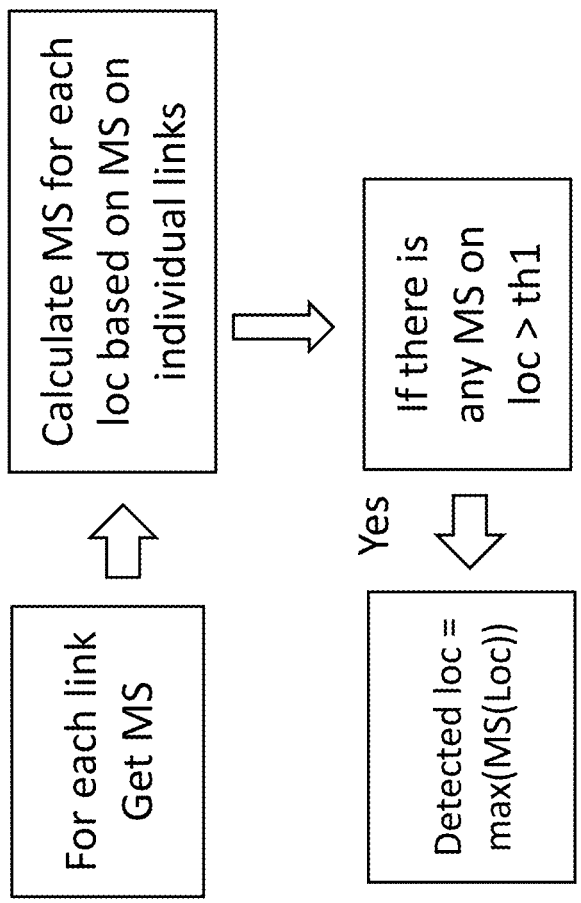
FIG. 7 illustrates an exemplary diagram showing an exemplary method for multi-way sensing, according to some embodiments of the present disclosure.

FIG. 7 illustrates an exemplary diagram showing an exemplary method for multi-way sensing, according to some embodiments of the present disclosure. An exemplary setup for the method shown in FIG. 7 is shown in FIG. 3, where a link is established between each pair of rooms 1, 2, 3, corresponding to locations loc1, loc2, loc3, respectively. As shown in FIG. 7, the system can obtain MS for each link. Then the system can calculate MS for each location based on MS on individual links. For example, ms(loc1)=ms(link12)+ms(link13)−ms(link23)=0.5*(ms(1→2)+ms(2→1)+ms(1→3)+ms(3→1)−ms(2→3)−ms(3→2)); ms(loc2)=ms(link12)+ms(link23)−ms(link13)=0.5*(ms(1→2)+ms(2→1)+ms(2→3)+ms(3→2)−ms(1→3)−ms(3→1)); ms(loc3)=ms(link13)+ms(link23)−ms(link12)=0.5*(ms (1→3)+ms(3→1)+ms(2→3)+ms(3→2)−ms(1→2)−ms(2→1)). The links (link12, link23, link13) can be referred back to FIG. 3. The MS ms(X→Y) means an MS calculated based on a wireless signal transmitted from locX to locY.

When there is any MS on any location is larger than a first threshold (th1), a motion location (loc) is detected based on max(MS(Loc)), which is the location having maximum MS among all locations.

FIG. 8 illustrates an exemplary performance of response time for wireless sensing based on repetition test, according to some embodiments of the present disclosure. FIG. 8 shows MS for three sets of single-way structure and a multi-way structure, in different rooms. In addition, FIG. 8 shows proximity statistics (PS), e.g. an autocorrelation function (ACF) or autocovariance function of the CSI, at different rooms for multi-way structure. Further, FIG. 8 shows maximum ratio combining (MRC)-based MS at different rooms for multi-way structure.

In some embodiments, MRC is applied on motion statistics (not proximity statistics), as MRC selects subcarriers while proximity statistics relies on the continuity of the subcarriers. The MRC may be applied in two ways. MRC1: applying MRC on the link separately and average them to form a two-way link, e.g. applying MRC on loc1→loc2 and loc2→loc1, respectively and average them to form loc1←→loc2. MRC2: combining two links between two locations (e.g. loc1→loc2 and loc2→loc1) together and applying the MRC on all subcarriers, e.g. for each pair of Tx/Rx, there are 52 subcarriers and therefore, for loc1←→loc2, there are 104 subcarriers.

FIG. 9 illustrates an exemplary performance of various ratios for wireless sensing based on repetition test, according to some embodiments of the present disclosure. An overlap ratio is a ratio of the overlapped time with the ground truth. A detected ratio is a ratio of the correctly detected time to all positive time of ground truth. A false alarm ratio is a ratio of the wrongly detected time to all negative time of ground truth.

In some embodiments, another metric may be considered based on a ratio of dynamic signals, $$x = \frac{|H_d|^2}{|H_d|^2 + |H_s|^2}.$$

To get the ratio of dynamic signals (x), the system can perform amplitude normalization and phase cleaning to get $H_d$ and $H_s$ first. When the moving object is closer, x is larger. Because window over time is not involved in the calculation, no window is applied.

FIG. 10 illustrates an exemplary performance of response time for wireless sensing based on transition test, according to some embodiments of the present disclosure, with similar parameter definitions to FIG. 8. FIG. 11 illustrates an exemplary performance of various ratios for wireless sensing based on transition test, according to some embodiments of the present disclosure, with similar parameter definitions to in FIG. 9. In some embodiments, the system can put different weights to different evaluation metrics and get a final rank of the features. For example, consider detection delay (DD) (e.g. based on response time) and detection ratio (DR), if the DD is more important, then put 0.8 to the DD rank and 0.2 to the DR rank.

In some embodiments, in the system, a Type1 heterogeneous wireless device (wireless transmitter) may transmit a series of wireless sounding signals to a Type2 heterogeneous wireless device (wireless receiver). The Type1 device and the Type2 device form a device-link. The Type1 device may have M1 antennas. The Type2 device may have M2 antennas. The Type2 device may obtain a number (M3=M1*M2) of time series of channel information (CI, e.g. CSI, CFR, CIR, etc.) based on the received wireless sounding signals, each CI based on a respective received sounding signal. Each TSCI may be associated with an antenna-link (which may be the link between a transmit antenna of the Type1 device and a receive antenna of the Type2 device). There may be M antenna-links associated with the device-link. Each CI may have N components (e.g. N subcarriers for CFR or N taps for CIR). Each component (CI-component) may be a complex number.

Motion localization: The venue may be partitioned into a number of regions (e.g. living room, dining room, kitchen, bedroom 1, bedroom 2, bedroom 3, rest room 1, rest room 2, first floor, second floor, basement, garage, patio, deck, etc.). Motion localization is a wireless sensing task to determine, based on the TSCI, a location (i.e. one of the regions in the venue) in which the object motion is detected/associated with.

System setup: Zero, one or more than one Type1 heterogeneous wireless device (wireless transmitter, Tx, that sends wireless sounding signals to Type2 devices) or Type2 heterogeneous wireless device (wireless receiver, Rx, that receives wireless sounding signals from Type1 devices) may be present/installed in each of the regions. Each region may be associated with a device (Type1 or Type2) of the system.

A device (a sensing device of the system) may play the role of either or both the Type1 device and Type2 device. Between a pair of devices, wireless sounding signals may be sent (e.g. based on a protocol or standard such as 802.11, 802.11bf) either one-way (from Type1 device to Type2 device s.t. TSCI is obtained in the Type2 device) or two-way (i.e. from device A to device B and vice versa such that the resulting TSCI may be obtained in both devices).

Network configuration: In one case, most (or all) Type1 devices and/or Type2 devices may be non-AP devices associated/connected to a wireless access point (AP) in a wireless network (infrastructure mode). The AP may be one of the Type1 or Type2 devices such that wireless sounding signals may be sent between AP and non-AP devices. Wireless sounding signals may also be sent between pairs of non-AP devices.

In another case, the Type1 and/or Type2 devices may be operating in non-infrastructure in an adhoc network/peer-to-peer network. Each device may function as Type1 device to transmit wireless sounding signals to neighboring associated/connected/linked devices or function as Type2 device to receive wireless sounding signals from the neighboring devices.

In some embodiments, each region in the venue is associated with a sensing device. The goal of motion localization is to find a location (region) associated with a detection of a target (e.g. detection of motion, detection of presence, detection of breathing, detection of fall-down, detection of sleeping, etc.).

In some embodiments, the present teaching discloses a basic algorithm to perform motion localization (to determine location of detected target).

In step 1 of the algorithm, for each device-link, compute a link-wise motion statistics (link-MS, or LMS). The link-MS may be a motion statistics (MS) for performing the detection of the target. For the device link, a large link-MS may suggest a larger likelihood/tendency that the target is detected. For simple target detection, if the system just wants to detect the target, all the LMS may be combined/fused/aggregated to form an aggregate MS. The target may be detected if the aggregate MS is larger than a threshold. Here are a few forms of link-MS.

A first form of link-MS is TRRS with MRC. The link-MS may be a temporal correlation, temporal covariance, or dot product of two CI vectors. A CI vector comprises the components of CI (CI-components, e.g. components of CSI, subcarrier of CFR, taps of CIR) arranged in the form of a vector. The link-MS may be a TRRS (time reversal resonance strength). The two CIs may be two temporally adjacent CI. Component-wise temporal correlation, temporal covariance or the dot product may be computed. The link-MS may be a sum, weighted sum, average and/or weighted average of the component-wise values. Maximum ratio combining (MRC) may be applied, with each component weighted to compute the link-MS. The weight for a component may be based on a correlation or product of the component between two adjacent CI. The MRC may be applied in two ways: (1) for each antenna-link, a respective TSCI may be obtained. The MS may be computed for each antenna-link based on the respective TSCI. For each antenna link, the correlation, covariance, or dot product of two CI vectors may be computed with component-wise values weighted using MRC. Then all the correlation, covariance or dot products may be averaged (or weighted averaged). (2) All the antenna-links are considered together. All the component-wise values are considered together with MRC applied to all the component-wise values.

A second form of link-MS is likelihood. Let MS be the correlation, covariance, or dot product of two temporal adjacent CSI vectors. The MS may be averaged/smoothed over a sliding time window. The link-MS may be the smoothed MS. The link-MS may also be the MS gated with a threshold (e.g. being 1 if great than threshold and 0 (or −1) if less than threshold).

A third form of link-MS is a New metric. The link-MS may be a fraction of dynamic energy over the total energy. The total energy may comprise a dynamic component (dynamic energy) and a static component (static/stationary energy). The dynamic energy may be estimated as total energy minus an estimated static/stationary energy. The static/stationary energy may be estimated as a minimum energy over a long period of time, with some correction. The correction may be a scaling multiple or an additive offset or a combination. The dynamic/static energy estimate may be performed for each component of CSI. The component-wise dynamic/static energy estimates may be combined/aggregated (e.g. as a sum, weighted sum, average/arithmetic mean, weighted average, geometric mean, harmonic mean) to estimate the total dynamic/static energy. Maximum ratio combining (MRC) may be applied, with each component weighted to compute the total dynamic/static energy. The weight may be based on an estimated correlation between two adjacent CSI.

A fourth form of link-MS is intercomponent statistics. The link-MS may be an inter-component statistics. For example, correlation or covariance between any two components that are k index apart, i.e. the $i^{\{th\}}$ component and $(i+k)^{\{th\}}$ component, for all i. For example, inter-component correlation (k) may be $sum\_i\ [x(i)*x(i+k)]$. Weighting may be applied such that the inter-component correlation (k) may be $sum\_i\ [w(i)*\ x(i)*x(i+k)]$. The weight $w(i)$ may be determined by MRC.

In step 2 of the algorithm, for each candidate location (candidate region), compute a respective location-wise motion statistics (loc-MS) based on ALL the link-MS. Here are some possible forms of loc-MS.

A first form of loc-MS is weighted sum. The loc-MS may be a weighted sum (linear combination) of all the link-MS, in which each link-MS may be scaled by a scalar multiplier (i.e. the weight may be a scalar multiplier).

A second form of loc-MS is weighted product. The loc-MS may also be a weighted product of all the link-MS, in which each link-MS may be raised to a power (i.e. the weight may be the power).

A third form of loc-MS is weighted sum of polynomial/power: The loc-MS may also be a weighted sum of a polynomial (e.g. $x^p$, or in general, $f(x)=sum\_i\ (a\_i*x^i)$) of each link-MS. Let ms(i) be the link-MS of $i^{\{th\}}$ device-link. The loc-MS for $i^{\{th\}}$ candidate location may be $f(ms(i))/\{sum\_k\ f(ms(k))\}$. A special case is $\{ms(i)\}^p/sum\_k\ \{ms(k)^p\}$. The loc-MS may be smoothed/weight-averaged over a sliding time window.

Weight determination based on neighborhood: For each device-link in a "neighborhood" of the candidate location, the weights of the associated link-MS in the loc-MS computation may be positive. For each device-link outside the "neighborhood" of the candidate location, the weights of the associated link-MS in the loc-MS computation may be negative. For example, the neighborhood may comprise all device-links "containing" the candidate location. A device-link may "contain" the candidate location if the sensing device associated with the candidate location is either the Type1 or Type2 device in the device link.

Weight determination based on distance: A "distance" may be defined between the candidate location and each device-link. The distance may be smaller when the device-link is "closer" to the candidate location. The distance may be larger when the device-link is farther away from the candidate location. Recall that the device-link connects/links two sensing devices, say A and B, together. The candidate location is associated with a device, say C. Let "distance A" may be a number (e.g. minimum number) of "hops" or device-links to be traversed before device A can reach device C wirelessly via device-links (e.g. in the adhoc network). Similarly, let "distance B" may be a number (e.g. minimum number) of "hops" or device-links to be traversed before device B can reach device C wirelessly via device-links. The distance between the candidate location and the device-link may be the smaller of distance A and distance B. A device-link with device C being one of the Type1 or Type2 devices may have a distance of zero.

Consider the "relative contribution" of two link-MS to the loc-MS of a particular candidate location. Their relative contribution may be their weights if the loc-MS is a linear combination (i.e. weighted sum) of all link-MS. The relative contribution may be their weights/powers if the loc-MS is a weighted product of all link-MS. The relative contribution of the link-MS whose associated device-link has a smaller distance (i.e. closer) to the candidate location may be larger than (e.g. more positive or less negative) than the relative contribution of the link-MS whose associated device-link has a larger distance to the candidate location.

In step 3 of the algorithm, target detection is performed. If any loc-MS is greater than a threshold, a target is detected. In step 4 of the algorithm, target location determination is performed. If the target is detected, the location of the target is computed as the candidate location associated the largest loc-MS. When there are multiple targets, for the remaining candidate locations, if any remaining loc-MS is greater than another threshold, a second target may be detected. The location of the second target may be computed as the remaining candidate location associated with the remaining largest loc-MS. The third, fourth, . . . target may be detected in a similar manner.

Correction for heterogeneous device-links: As the device-links may be heterogeneous/different (e.g. each uses one of 20/40/80/160/320/640 MHz, or each with 1/2/3/4/6/8/10/12 antenna-pairs, some with sounding frequency being one of: 1/10/100/1000 Hz, etc.), a respective (e.g. tailored/adaptively determined) heterogeneous correction (e.g. a univariate correction, a multivariate correction, an additive offset, a scalar multiple, a linear or non-linear mapping/function, an adaptive non-linear function, filtering, frequency-based correction, temporal correction, or a combination) may be applied to each link-MS. The heterogeneous correction may or may not be integrated with the weighting in the loc-MS (i.e. the weights used in the weighted sum or weighted-products).

Missing link compensation: The wireless network may be an adhoc network. Let an ideal adhoc network be a fully connected network. In some situations, an actual adhoc network may be an ideal adhoc network. In more probable situations, an actual adhoc network may not be ideal, with some of the "ideal" device-links missing. Let a "missing link" be a device-link present in the ideal fully-connected network but missing in the actual adhoc network.

Recall that the weights for a link-MS for a loc-MS may be positive in a neighborhood and negative outside the neighborhood. To ensure that the loc-MS for different candidate locations may be compared properly for the determination of the location of the target, the missing links in the neighborhood may be compensated (missing link compensation) in one way and the missing links outside the neighborhood may be compensated in another way. One way to compensate a missing link may be to allocate its weight to the non-missing link of the same kind. For example, the weight for a missing link inside the neighborhood may be distributed (e.g. equally or unequally) among the non-missing links inside the neighborhood based on a strategy. The weight for a missing link outside the neighborhood may be distributed (e.g. equally or unequally) among the non-missing links outside the neighborhood based on another strategy. Alternatively, the weight for a missing link inside (or outside) the neighborhood may be distributed (e.g. equally or unequally based on a strategy) among the non-missing links outside and/or inside the neighborhood.

As the neighborhood for each candidate location is different. The collection of missing links inside (or outside) the neighborhood may be different. Thus the missing link compensation may be different for different candidate locations.

Two-way/multi-way sensing: For a device-link between two devices, say, device A and device B. Two sounding signals may be transmitted in both ways (from A to B, and from B to A), such that two TSCI may be obtained, one in device A and one in device B. The two TSCI (say, TSCI-1 and TSCI-2) may be averaged in the computation of link-MS associated with the device-link. If the sensing conditions/settings/parameters of the two sounding signals are different. Two motion statistics, say, MS-1 and MS-2 may be computed, MS-1 based on TSCI-1 and MS-2 based on TSCI-2. The link-MS for this device-link may be a weighted average of MS-1 and MS-2. The weights may compensate, partially, for the difference between the two sounding signals.

Figure 12:
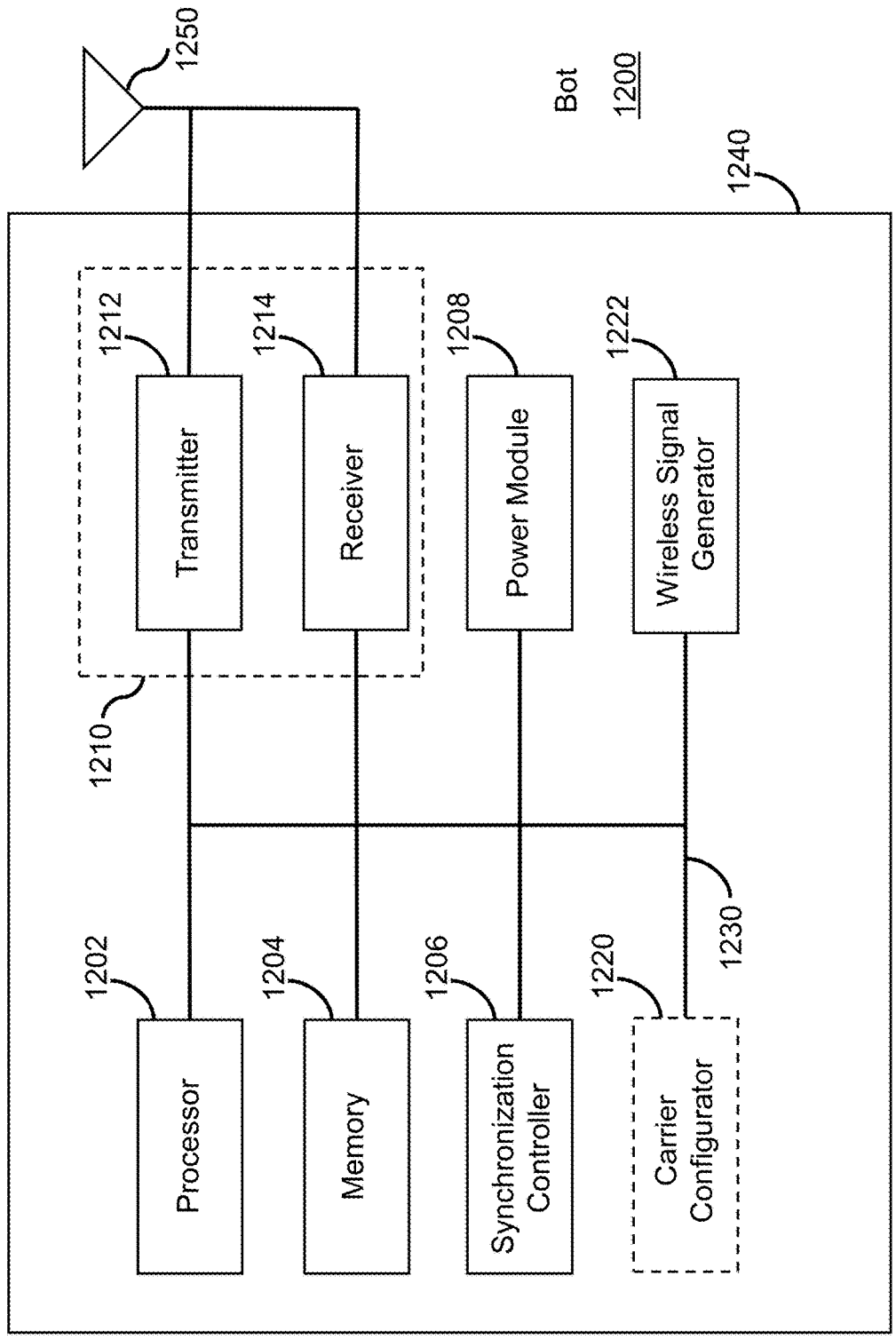
FIG. 12 illustrates an exemplary block diagram of a first wireless device of a system for wireless sensing, according to some embodiments of the present disclosure.

FIG. 12 illustrates an exemplary block diagram of a first wireless device, e.g. a Bot 1200, of a system for wireless sensing, according to some embodiments of the present disclosure. The Bot 1200 is an example of a device that can be configured to implement the various methods described herein. As shown in FIG. 12, the Bot 1200 includes a housing 1240 containing a processor 1202, a memory 1204, a transceiver 1210 comprising a transmitter 1212 and receiver 1214, a synchronization controller 1206, a power module 1208, an optional carrier configurator 1220 and a wireless signal generator 1222.

In this embodiment, the processor 1202 controls the general operation of the Bot 1200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1204, which can include both read-only memory (ROM) and random access memory (RAM), can provide instructions and data to the processor 1202. A portion of the memory 1204 can also include non-volatile random access memory (NVRAM). The processor 1202 typically performs logical and arithmetic operations based on program instructions stored within the memory 1204. The instructions (a.k.a., software) stored in the memory 1204 can be executed by the processor 1202 to perform the methods described herein. The processor 1202 and the memory 1204 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1210, which includes the transmitter 1212 and receiver 1214, allows the Bot 1200 to transmit and receive data to and from a remote device (e.g., an Origin or another Bot). An antenna 1250 is typically attached to the housing 1240 and electrically coupled to the transceiver 1210. In various embodiments, the Bot 1200 includes (not shown) multiple transmitters, multiple receivers, and multiple transceivers. In one embodiment, the antenna 1250 is replaced with a multi-antenna array 1250 that can form a plurality of beams each of which points in a distinct direction. The transmitter 1212 can be configured to wirelessly transmit signals having different types or functions, such signals being generated by the processor 1202. Similarly, the receiver 1214 is configured to receive wireless signals having different types or functions, and the processor 1202 is configured to process signals of a plurality of different types.

The Bot 1200 in this example may serve as a Bot or TX in FIGS. 1-11 for wireless sensing. For example, the wireless signal generator 1222 may generate and transmit, via the transmitter 1212, a wireless signal through a wireless channel in the venue. The wireless signal carries information of the channel. Because the wireless signal is impacted by a motion of an object in the venue, the channel information includes information about the motion and location of the motion. As such, motion detection and localization can be detected following the methods disclosed above. The generation of the wireless signal at the wireless signal generator 1222 may be based on a request for sound sensing from another device, e.g. an Origin, or based on a system pre-configuration. That is, the Bot 1200 may or may not know that the wireless signal transmitted will be used for wireless sound sensing.

The synchronization controller 1206 in this example may be configured to control the operations of the Bot 1200 to be synchronized or un-synchronized with another device, e.g. an Origin or another Bot. In one embodiment, the synchronization controller 1206 may control the Bot 1200 to be synchronized with an Origin that receives the wireless signal transmitted by the Bot 1200. In another embodiment, the synchronization controller 1206 may control the Bot 1200 to transmit the wireless signal asynchronously with other Bots. In another embodiment, each of the Bot 1200 and other Bots may transmit the wireless signals individually and asynchronously.

The carrier configurator 1220 is an optional component in Bot 1200 to configure transmission resources, e.g. time and carrier, for transmitting the wireless signal generated by the wireless signal generator 1222. In one embodiment, each CI of the time series of CI has one or more components each corresponding to a carrier or sub-carrier of the transmission of the wireless signal. The wireless sound sensing may be based on any one or any combination of the components.

The power module 1208 can include a power source such as one or more batteries, and a power regulator, to provide regulated power to each of the above-described modules in FIG. 12. In some embodiments, if the Bot 1200 is coupled to a dedicated external power source (e.g., a wall electrical outlet), the power module 1208 can include a transformer and a power regulator.

The various modules discussed above are coupled together by a bus system 1230. The bus system 1230 can include a data bus and, for example, a power bus, a control signal bus, and/or a status signal bus in addition to the data bus. It is understood that the modules of the Bot 1200 can be operatively coupled to one another using any suitable techniques and mediums.

Although a number of separate modules or components are illustrated in FIG. 12, persons of ordinary skill in the art will understand that one or more of the modules can be combined or commonly implemented. For example, the processor 1202 can implement not only the functionality described above with respect to the processor 1202, but also implement the functionality described above with respect to the wireless signal generator 1222. Conversely, each of the modules illustrated in FIG. 12 can be implemented using a plurality of separate components or elements.

Figure 13:
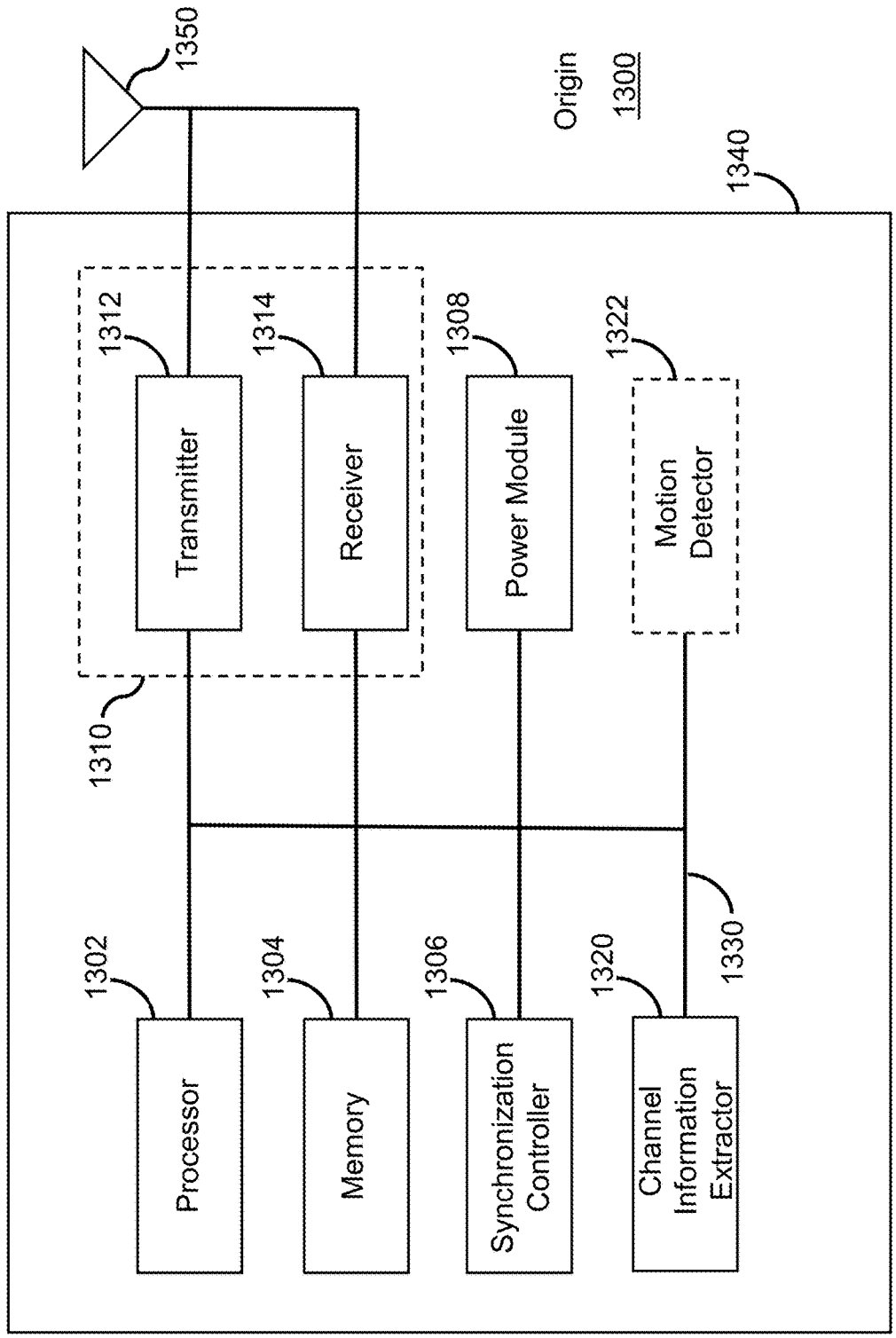
FIG. 13 illustrates an exemplary block diagram of a second wireless device of a system for wireless sensing, according to some embodiments of the present disclosure.

FIG. 13 illustrates an exemplary block diagram of a second wireless device, e.g. an Origin 1300, of a system for wireless sensing, according to one embodiment of the present teaching. The Origin 1300 is an example of a device that can be configured to implement the various methods described herein. The Origin 1300 in this example may serve as an Origin or RX in FIGS. 1-11 for wireless sensing in a venue. As shown in FIG. 13, the Origin 1300 includes a housing 1340 containing a processor 1302, a memory 1304, a transceiver 1310 comprising a transmitter 1312 and a receiver 1314, a power module 1308, a synchronization controller 1306, a channel information extractor 1320, and an optional motion detector 1322.

In this embodiment, the processor 1302, the memory 1304, the transceiver 1310 and the power module 1308 work similarly to the processor 1202, the memory 1204, the transceiver 1210 and the power module 1208 in the Bot 1200. An antenna 1350 or a multi-antenna array 1350 is typically attached to the housing 1340 and electrically coupled to the transceiver 1310.

The Origin 1300 may be a second wireless device that has a different type from that of the first wireless device (e.g. the Bot 1200). In particular, the channel information extractor 1320 in the Origin 1300 is configured for receiving the wireless signal through the wireless channel, and obtaining a time series of channel information (CI) of the wireless channel based on the wireless signal. The channel information extractor 1320 may send the extracted CI to the optional motion detector 1322 or to a motion detector outside the Origin 1300 for wireless sound sensing in the venue.

The motion detector 1322 is an optional component in the Origin 1300. In one embodiment, it is within the Origin 1300 as shown in FIG. 13. In another embodiment, it is outside the Origin 1300 and in another device, which may be a Bot, another Origin, a cloud server, a fog server, a local server, and an edge server. The optional motion detector 1322 may be configured for detecting sound information from a vibrating object or source in the venue based on motion information. The motion information may be computed based on the time series of CI by the motion detector 1322 or another motion detector outside the Origin 1300.

The synchronization controller 1306 in this example may be configured to control the operations of the Origin 1300 to be synchronized or un-synchronized with another device, e.g. a Bot, another Origin, or an independent motion detector. In one embodiment, the synchronization controller 1306 may control the Origin 1300 to be synchronized with a Bot that transmits a wireless signal. In another embodiment, the synchronization controller 1306 may control the Origin 1300 to receive the wireless signal asynchronously with other Origins. In another embodiment, each of the Origin 1300 and other Origins may receive the wireless signals individually and asynchronously. In one embodiment, the optional motion detector 1322 or a motion detector outside the Origin 1300 is configured for asynchronously computing respective heterogeneous motion information based on the respective time series of CI.

The various modules discussed above are coupled together by a bus system 1330. The bus system 1330 can include a data bus and, for example, a power bus, a control signal bus, and/or a status signal bus in addition to the data bus. It is understood that the modules of the Origin 1300 can be operatively coupled to one another using any suitable techniques and mediums.

Although a number of separate modules or components are illustrated in FIG. 13, persons of ordinary skill in the art will understand that one or more of the modules can be combined or commonly implemented. For example, the processor 1302 can implement not only the functionality described above with respect to the processor 1302, but also implement the functionality described above with respect to the channel information extractor 1320. Conversely, each of the modules illustrated in FIG. 13 can be implemented using a plurality of separate components or elements.

Figure 14:
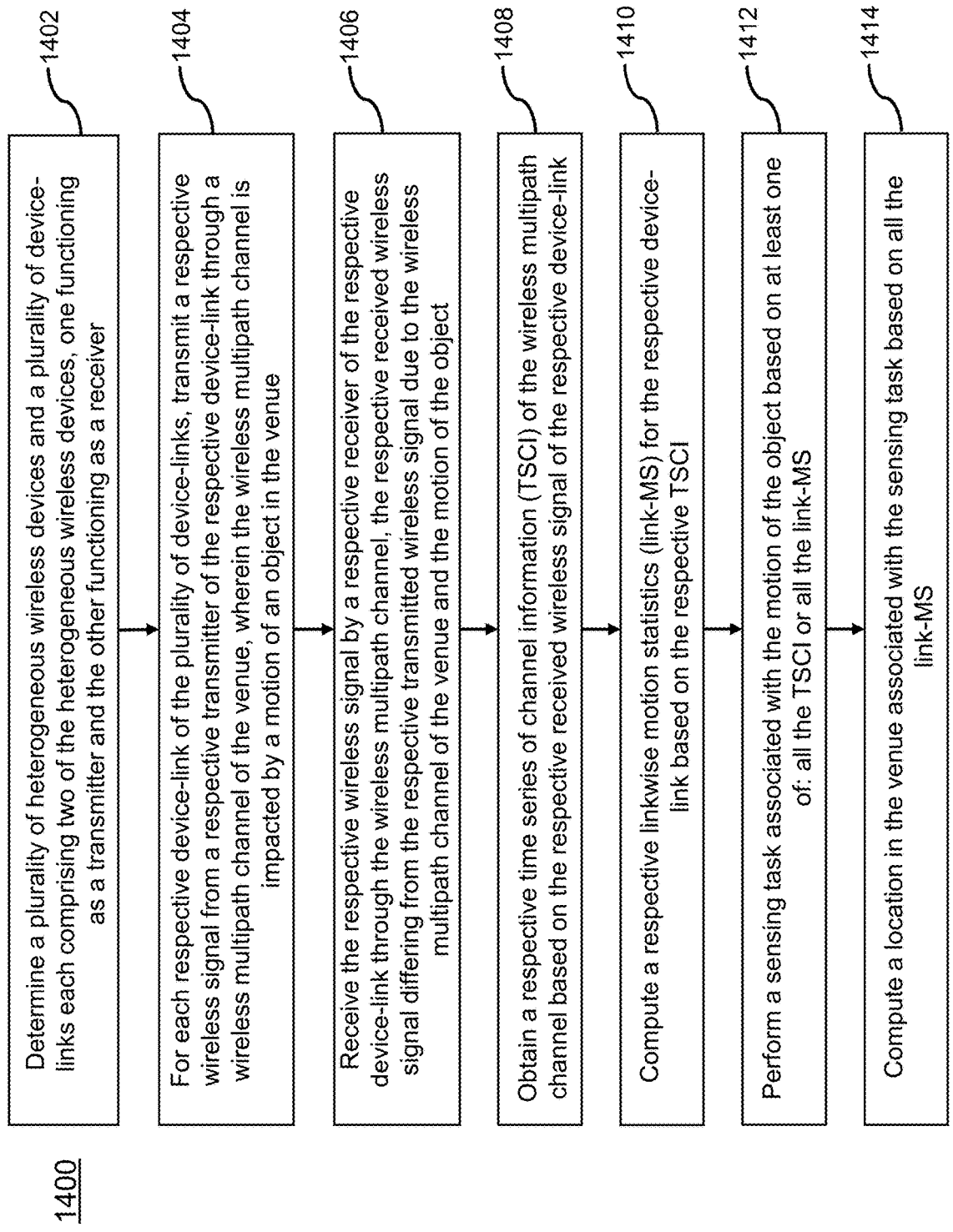
FIG. 14 illustrates a flow chart of an exemplary method for wireless sensing, according to some embodiments of the present disclosure.

FIG. 14 illustrates a flow chart of an exemplary method 1400 for wireless sensing, according to some embodiments of the present disclosure. In various embodiments, the method 1400 can be performed by the systems disclosed above and herein. At operation 1402, a plurality of heterogeneous wireless devices are determined and a plurality of device-links each comprising two of the heterogeneous wireless devices are also determined. One of the two devices functions as a transmitter and the other one functions as a receiver. At operation 1404, for each respective device-link of the plurality of device-links, a respective wireless signal is transmitted from a respective transmitter of the respective device-link through a wireless multipath channel of the venue. The wireless multipath channel is impacted by a motion of an object in the venue. At operation 1406, the respective wireless signal is received by a respective receiver of the respective device-link through the wireless multipath channel. The respective received wireless signal differs from the respective transmitted wireless signal due to the wireless multipath channel of the venue and the motion of the object. At operation 1408, a respective time series of channel information (TSCI) of the wireless multipath channel is obtained based on the respective received wireless signal of the respective device-link. At operation 1410, a respective linkwise motion statistics (link-MS) is computed for the respective device-link based on the respective TSCI. At operation 1412, a sensing task associated with the motion of the object is performed based on at least one of: all the TSCI or all the link-MS. At operation 1414, a location in the venue associated with the sensing task is computed or determined based on all the link-MS. The order of the operations in FIG. 14 may be changed according to various embodiments of the present teaching.

In some embodiments, there may be more than one device-links (e.g. in a star network/configuration in infrastructure mode, or in an adhoc/peer-to-peer network in non-infrastructure mode). In each device-link, a device (Type1 device) sends a respective wireless signal to another device (Type2) so that TSCI is obtained in the another device. A device may be associated with more than one device-links. The device may function as Type1 device in one device-link and as Type2 device in another device-link. A link-MS may be computed for each device-link. A sensing task (e.g. breathing detection, motion estimation, fall down detection, gait detection, etc.) may be performed based on the more than one link-MS. A location associated with the sensing task may be computed based on the link-MS.

The following numbered clauses provide examples for wireless sensing.

Clause 1. A method/device/system/software of a wireless sensing system, comprising: determining a plurality of heterogeneous wireless devices of the wireless sensing system in a venue; determining a number of device-links, wherein each device-link comprises two of the heterogeneous wireless devices one functioning as a Type1 device (wireless transmitter) and the other one as a Type2 device (wireless receiver); transmitting a respective wireless signal from a respective Type1 device of each device-link through a wireless multipath channel of a venue, wherein the wireless multipath channel is impacted by a motion of an object in the venue; receiving the respective wireless signal by a respective Type2 device of the respective device-link through the wireless multipath channel, wherein the respective received wireless signal differs from the respective transmitted wireless signal due to the wireless multipath channel of the venue and the motion of the object; obtaining a respective time series of channel information (TSCI) of the wireless multipath channel based on the respective received wireless signal of the respective device-link using a respective processor, a respective memory and a respective set of instructions; computing a respective linkwise motion statistics (link-MS) for the respective device-link based on the respective TSCI; performing a sensing task associated with the motion of the object based on at least one of: all the TSCI or all the link-MS; computing a location in the venue associated with the sensing task based on all the link-MS.

Clause 2. The method/device/system/software of the wireless sensing system of clause 1, comprising: wherein the sensing task comprises at least one of: a detection of the motion of the object, a detection of a motion sequence of the object, a monitoring of the motion of the object, a classification of the motion of the object, a detection of a presence, an absence, an entrance or a departure of the object, a detection of a target motion of the object, a monitoring of a location, a speed or an acceleration of the object, a detection of a fall of the object, a detection of a periodic motion of the object, a detection of a breathing of the object, a detection of a heartbeat of the object, a monitoring of the breathing of the object, a detection of a sleep of the object, a detection of a sleep state of the object, a detection of a rapid-eye-motion (REM), non-REM (NREM), or awake state of the object, a monitoring of the sleep of the object, a detection of a speech, an utterance or a sound of the object, a monitoring of the speech, the utterance or the sound of the object, an enhancement of the speech, the utterance or the sound of the object, a detection of a gait of the object, a detection of a walking of the object, a detection of a gesture of the object, a detection of a handwriting of the object, a counting of the object, a detection of a user input of the object. Some possible link-MS. Different sensing task may require different link-MS.

Clause 3. The method/device/system/software of the wireless sensing system of clause 1, comprising: wherein the link-MS computed based on a respective TSCI comprises at least one of: time reversal resonating strength (TRRS), feature, magnitude, phase, power, mean, moving average, median, mode, statistical characteristics, variance, standard deviation, variation, derivative, slope, total variation, absolute variation, square variation, spread, dispersion, variability, deviation, divergence, range, skewness, kurtosis, likelihood, entropy, regularity, similarity, probability distribution function, moment generating function, correlation, cross correlation, auto-correlation, correlation indicator, correlation coefficient, component-wise correlation, a feature of autocorrelation function (ACF), covariance, cross covariance, auto-covariance, component-wise covariance, inner product of two vectors, outer product, dot product, projection, similarity score, distance score, Euclidean distance, absolute distance, graph distance, discrimination score, norm, metric, quality metric, signal quality condition, periodicity, repeatedness, impulsiveness, change, recurrence, period, time, duration, timing, time trend, rhythm, frequency, spectrum, total energy, static energy, temporal minimum of total energy, temporal minimum of total energy with a correction, dynamic energy, difference of total energy and static energy.

Clause 4. The method/device/system/software of the wireless sensing system of clause 1, comprising: preprocessing the respective TSCI; smoothing the respective link-MS over time based on a smoothing filter.

Perform correction to a link-MS (e.g. add an offset of the link-MS, scale the link-MS by a multiplying factor, adjust the weight of the link-MS in the computation of loc-MS, etc.). It may be a correction to account for heterogeneous characteristics experienced in device-links (e.g. different bandwidth, different antenna characteristics, different gain setting, different hardware/software/firmware, different wireless hardware/module/chip/IC, different interference exposure, different noise level, etc.).

Clause 5. The method/device/system/software of the wireless sensing system of clause 1, comprising: applying a correction to a particular link-MS associated with a particular device-link based on a characteristics of the Type1 device, the Type2 device and the wireless signal associated with the particular device-link.

Clause 6. The method/device/system/software of the wireless sensing system of clause 1, comprising: wherein the correction is at least one of: pre-determined, or adaptively determined.

A link-MS may be computed by aggregating (e.g. weighted sum, average, trimmed mean, root mean square, weighted product, etc.) multiple candidate link-MS.E ach candidate link-MS may be computed based on a respective TSCI.

Clause 7. The method/device/system/software of the wireless sensing system of clause 1, comprising: wherein at least one of: a particular Type1 device and a particular Type2 device, associated with a particular device-link comprises more than one antennas; obtaining more than one particular TSCI of the wireless multipath channel based on a particular received wireless signal of the particular device-link; computing more than one candidate link-MS based on the more than one respective particular TSCI, each candidate link-MS based on a respective particular TSCI; aggregating the more than one candidate link-MS to compute a particular link-MS associated with the particular device-link.

Each CI may have more than one components (e.g. sub-carriers in CFR, taps in CIR) Candidate/component link-MS may be computed based on the more than one components. One component/candidate link-MS may be computed based on one component, or two or more components. The component link-MS may be an inter-component statistics. E.g. correlation between two components (with component index difference of 1, 2, 3, . . . , etc.). A link-MS may be computed by aggregating (e.g. weighted sum, average, trimmed mean, root mean square, weighted product, etc.) multiple component/candidate link-MS.

Clause 8. The method/device/system/software of the wireless sensing system of clause 1, comprising: wherein each channel information (CI) of a particular TSCI associated with a particular device-link comprises more than one components; computing more than one candidate link-MS based on the more than one components of the CI of the particular TSCI; aggregating the more than one candidate link-MS to compute a particular link-MS for the particular device-link based on the particular TSCI.

Clause 9. The method/device/system/software of the wireless sensing system of clause 1, comprising: obtaining more than one particular TSCI of the wireless multipath channel based on a particular received wireless signal of a particular device-link, wherein each channel information (CI) of each particular TSCI comprises more than one components; for each of the more than one particular TSCI: computing more than one respective component link-MS based on the more than one components of the CI of the respective particular TSCI, and aggregating the more than one respective component link-MS to compute a respective candidate link-MS for the particular device-link; aggregating the more than one candidate link-MS to compute a particular link-MS associated with the particular device-link.

When combining the component/candidate link-MS, MRC may be used.

Clause 10. The method/device/system/software of the wireless sensing system of clause 7, 8 or 9, comprising: aggregating the more than one candidate link-MS based on a maximum ratio combining (MRC).

Venue may be partitioned/divided into more than one regions. The regions may/may not be overlapping. The location may be an indication of which region the sensing task is detected.

Clause 11. The method/device/system/software of the wireless sensing system of clause 1, comprising: partitioning the venue into a plurality of regions, wherein each region is a candidate location associated with the sensing task; associating each region with one of the heterogeneous wireless devices; computing the location associated with the sensing task as one of the plurality of candidate locations.

Compute location-wise MS (loc-MS) for each candidate location based on the link-MS.

Clause 12. The method/device/system/software of the wireless sensing system of clause 11, comprising: computing a respective location-wise motion statistics (loc-MS) for each candidate location based on all the link-MS; computing the location based on all the loc-MS.

Compute location as the candidate location with largest loc-MS.

Clause 13. The method/device/system/software of the wireless sensing system of clause 12, comprising: comparing a measure of the plurality of loc-MS; detecting a target associated with the sensing task if at least one loc-MS has a measure greater than a threshold.

Compute location as the candidate location with largest loc-MS.

Clause 14. The method/device/system/software of the wireless sensing system of clause 13, comprising: computing the location of the target as a candidate location whose loc-MS has the measure being a maximum among the plurality of loc-MS.

Compute location as the candidate location with largest loc-MS.

Clause 15. The method/device/system/software of the wireless sensing system of clause 14, comprising: removing the location of the target from the plurality of candidate locations; detecting a second target associated with the sensing task if at least one loc-MS associated with the remaining candidate locations has a measure greater than a second threshold; computing a second location of the second target as one of the remaining candidate location whose loc-MS has the measure being a maximum among the plurality of loc-MS.

Clause 16. The method/device/system/software of the wireless sensing system of clause 12, comprising: wherein the loc-MS comprises at least one of: a sum, a weighted sum, a product, a weighted product, an average, a weighted average, a difference, a weighted difference, a linear combination, a mean, a truncated mean, a trimmed mean, an inter-quartile mean, a weighted mean, an arithmetic mean, a geometric mean, a harmonic mean, an arithmetic-geometric mean, an arithmetic-harmonic mean, a Cesaro mean, a Chisini mean, a contraharmonic mean, an elementary symmetric mean, a geometric-harmonic mean, a grand mean, a Heinz mean, a Heronian mean, an Identric mean, a Lehmer mean, a logarithmic mean, a moving average, a Neuman-Sandor mean, a quasi-arithmetic mean, a Renyi's entropy, a generalized f-mean, a spherical mean, a Stolarsky mean, a weighted arithmetic mean, a weighted geometric mean, a weighted harmonic mean, a median, a weighted median, a mode, a weighted mode, a weighted sum of a function, a weighted product of the function, a weighted average of the function, a weighted mean of the function, a weighted arithmetic mean of the function, a weighted geometric mean of the function, a weighted harmonic mean of the function, a root mean square, a quadratic mean, or a weighted root mean square, of all the link-MS;

Possible functions for the definitions of loc-MS.

Clause 17. The method/device/system/software of the wireless sensing system of clause 16, comprising: wherein the function comprises at least one of: a linear function, a piecewise linear function, a nonlinear function, a recursive function, a quadratic function, a polynomial function, a rational function, an algebraic function, an elementary function, a logarithm function, a root function, an exponential function, a trigonometric function, a hyperbola function, an inverse function, a continuous function, a differentiable function, an analytic function, a factorial function, a thresholding function, an indicator function, a constant function, a projection function a composite function, a function of a function, a univariate function, a bivariate function, a multivariate function, a special function, a complementary function, an error function, a Bessel function, a gamma function, a series, a Taylor series, a Fourier series, a polynomial series, a hyper-geometric series, a distribution function, a cumulative distribution function, a normal distribution, a likelihood function, a sampling function, a quantization function, a monotonic function, a monotonic non-increasing function, or a monotonic non-decreasing function.

The loc-MS may be a weighted quantity (weighted sum, weighted product, etc.). Partition all device-links into two groups (e.g. one with positive weights, one with negative weights). Weights for Group 1 may be larger than weights for Group 2. Weights for Group 1 may all be equal. Weights for Group 2 may all be equal. For different candidate location, the partitioning may be different.

Clause 18. The method/device/system/software of the wireless sensing system of clause 12, comprising: wherein the loc-MS comprises one of: a weighted sum of all the link-MS, a weighted sum of a function of each link-MS, a weighted product of all the link-MS, or a weighted product of a function of each link-MS; wherein, in the weighted sum, each link-MS or the function of each link-MS is scaled by a respective weight; wherein, in the weighted product, each link-MS or the function of each link-MS is raised to a respective weighted power; for a particular candidate location associated with a particular heterogeneous wireless device: partitioning all the device-links into a first group and a second group, and computing the loc-MS for the particular candidate location such that the weight for each link-MS associated with the first group in the weighted sum is greater than the weight for any link-MS associated with the second group.

Positive weight for Group 1. Negative weight for Group 2.

Clause 19. The method/device/system/software of the wireless sensing system of clause 18, comprising: for the particular candidate location: computing the loc-MS for the particular candidate location with a positive weight for each link-MS associated with the first group and a negative weight for each link-MS associated with the second group.

Distance-1 device-links may be in Group 1. The other device-links may be in Group 2.

Clause 20. The method/device/system/software of the wireless sensing system of clause 18, comprising: wherein the first group comprises any device-link of which one of the Type1 device or the Type2 device is the particular heterogeneous wireless device.

Distance-1 and Distance-2 device-links may be in Group 1. The other device-links may be in Group 2.

Clause 21. The method/device/system/software of the wireless sensing system of clause 20, comprising: wherein the first group comprises any distance-1 device-link for the particular candidate location, which is a device-link of which one of the Type1 device and the Type2 device is the particular heterogeneous wireless device, and the other one of the Type1 device and the Type2 device is considered a distance-1 device for the particular candidate location; wherein the first group further comprises any distance-2 device-link for the particular candidate location, which is an additional device link of which one of the Type1 device and the Type2 device is a distance-1 device for the particular candidate location, and the other one of the Type1 device and the Type2 device is considered a distance-2 device for the particular candidate location.

Distance-1 devices may have larger weights than distance-2 devices. Distance-1 devices may be closer to the particular candidate location than the distance-2 devices.

Clause 22. The method/device/system/software of the wireless sensing system of clause 21, comprising: wherein the weight for a distance-1 device-link is greater than or equal to the weight for a distance-2 device link.

Group 1 devices may have recursively more distance-k device-links. The other device-links may be in Group 2.

Clause 23. The method/device/system/software of the wireless sensing system of clause 21, comprising: wherein the first group further recursively comprises any additional device-link of which one of the Type1 device and the Type2 device is a distance-k device for the particular candidate location, and the other one of the Type1 device and the Type2 device is considered a distance-(k+1) device for the particular candidate location.

Distance-k devices may have larger weights than distance-(k+1) devices. Distance-k devices may be closer to the particular candidate location than the distance-(k+1) devices.

Clause 24. The method/device/system/software of the wireless sensing system of clause 23, comprising: wherein the weight for a distance-k device-link is greater than or equal to the weight for a distance-(k+1) device link.

The device-links may be partitioned into 3 groups: one group with positive weights, one group with negative weights, one group with zero weights.

Clause 25. The method/device/system/software of the wireless sensing system of clause 18, comprising: for the particular candidate location: partitioning all the device-links into a first group, a second group, and a third group, computing the loc-MS for the particular candidate location such that: the weight for each link-MS associated with the first group in the weighted sum is greater than the weight for any link-MS associated with the second group and the third group, and the weight for each link-MS associated with the third group in the weighted sum is greater than the weight for any link-MS associated with the second group.

Clause 26. The method/device/system/software of the wireless sensing system of clause 25, comprising: for the particular candidate location: computing the loc-MS for the particular candidate location with a positive weight for each link-MS associated with the first group, a negative weight for each link-MS associated with the second group, and a zero weight for each link-MS associated with the third group.

For a particular link with two-way sounding (wireless signal sent from A to B, and also from B to A), there may be two device-links. The weights for the two associated link-MS may/may not be identical in the computation of loc-MS. The two respective link-MS may be aggregated (e.g. average, weighted average, root mean square, geometric mean, weighted geometric mean) to avoid double counting.

Clause 27. The method/device/system/software of the wireless sensing system of clause 18, comprising: wherein two device-links are associated with two particular heterogeneous wireless devices such that wireless signals are sent both ways, and TSCI are obtained at both devices; wherein the two link-MS associated with the two device-links have identical weights in the computation of the loc-MS for the particular candidate location.

The two respective link-MS may be replaced by an aggregate of the two link-MS (e.g. average, weighted average, root mean square, geometric mean, weighted geometric mean) to avoid double counting.

Clause 28. The method/device/system/software of the wireless sensing system of clause 18, comprising: replacing the two link-MS by a single link-MS which is equal to an aggregation of the two link-MS in the computation of the loc-MS for the particular candidate location.

Clause 29. The method/device/system/software of the wireless sensing system of clause 18, comprising: comparing a first collection of all the device-links in the system with a second collection of all possible device-links in a fully-connected configuration of the plurality of heterogeneous wireless devices; determining at least one missing device-link which is a device-link present in the second collection but absent in the first collection; applying a correction to the weights of the device-links in the first collection in the computation of the loc-MS, based on a hypothetical weight for each missing device-link.

Clause 30. The method/device/system/software of the wireless sensing system of clause 29, comprising: partitioning the second collection of all possible device-links into an extended first group and an extended second group, wherein the first group is a subset of the extended first group and the second group is a subset of the extended second group; applying the correction associated with a first missing device-link in the extended first group by distributing the hypothetical weight of the first missing device-link to the device-links in the first group; applying the correction associated with a second missing device-link in the extended second group by distributing the hypothetical weight of the second missing device-link to the device-links in the second group.

In some embodiments, systems and methods are disclosed for monitoring activity of daily living (ADL) with wireless sensing. With wireless sensing, the system can detect a person's motion and the location of the motion; and based on such information, can infer his/her activity. In some embodiments, for a system with 1 Origin and N Bots, an exemplary algorithm including the following steps for monitoring activity of daily living is described as follows.

At Step 1: based on CSI time series of all Origin-Bot pairs, and each time instance t and each bot i, calculate the motion statistics $MS(t,i)$, micro motion statistics $MM(t,i)$ and breathing rates $BR(t,i)$.

At Step 2: perform motion and breathing detection based on values obtained from Step 1. As a person's motion can be strong or weak, or even so weak that only his breathing can be detected, multiple features may be considered. For example, from (macro) motion detection, one can sense relatively strong motion; from micro motion statistics, one can sense medium/low motion; and from breathing detection, one can infer the existence of a stationary person with little motion. The input of the algorithm may include: $MS(t,i)$, $MM(t,i)$, and $BR(t,i)$. The output may be the motion location and motion level, denoted as [Loc, Level]. Since motion near Origin can result in non-negative $MS(t,i)$ for more than one Bots, and there may be no motion, the vector of Loc or Level has a dimension of N+2. This step may include sub-steps S2a-S2c.

At Step S2a: if $MS(t,i)>=Th0$ for at least one bot i, then perform motion detection and localization. If there is one person in the monitored area, then the system may decide the person is close to bot i* or in the region associated with bot i*, if $MS(t,i*)$ is the largest among all $\{MS(t,j)\}$, j=1, 2 . . . N. If $MS(t,i)>=Th0$ holds for more than N/2 Bots, then the motion is close to the Origin. Besides motion location, the system can also define motion level as a function of the $MS(t,i)$, which can reflect the strength of the person's motion. For instance, strong/medium/low motion corresponds to MS in [0.7, 1], [0.45, 0.7), [0.2, 0.45), respectively.

At Step S2b: if $MS(t,i)<Th0$ for all the N Bots, then perform micro motion detection and localization. One way to define micro motion statistics $MM(t,i)$ is described in Appendix V about micro motion (MM). If $MM(t,i)>=Th1$, then micro motion is detected, meaning a person is close to bot i or in the region associated with bot i. MM also reflects the strength of a person's mild motion and motion level can be similarly defined as in step S2a, maybe with different threshold values.

At Step S2c: if $MM(t,i)<Th1$ for all the N Bots, meaning the monitored area is stationary with little motion, then perform breathing detection and localization. $BR(t,i)$ denotes the breathing rate estimates based on a breathing estimation method. If $BR(t,i)$ is within [BR_min,BR_max], which means human respiration rate range, then a person is detected in the region associated with Bot i. Similar to motion level, the system may define breathing level as the "heavy" or "light", which reflects the breathing strength or stationariness. Breathing level depends on the time ratio during which breathing can be detected in a time window. For example, if in a 10 second window, breathing is detected for more than 5 seconds, then the breathing level is "high"; otherwise "low". State machine based on heuristics or Markov chain modeling may be introduced to improve the robustness of the activity monitoring. For example, in a one-person case, it is highly unlikely that at t, $BR(t,i)$ is within [BR_min,BR_max], and at t+1, $BR(t+1, j)$ is within [BR_min,BR_max], and j is not equal to I, without motion detected in between t and t+1.

At Step 3: the outputs of Step 2 are the motion locations and levels, which can be denoted as (Loc, level) or (0, 0). If in each sample, the method outputs the detection results, due to hardware imperfection or dynamics of propagation, the outputs may be noisy and cannot reflect true continuous activity. A possible way to eliminate the non-continuous activity is to add activity location detection and level estimation to smooth the results. For example, out of every 30 second window, a state change on (Loc, Level) keeps for at least 5 consecutive seconds, then the system can treat it as a real change in the monitored area; otherwise, the state will not be changed.

To improve the accuracy, a state machine can be defined, and less-possible transitions can be filtered. For example, using the following notations: B: breathing, N: no signal, MM: micro motion, the following transitions between various states in two adjacent time slots are less likely to happen: (loc_i, B)→(no_loc, N); (loc_i, B)→(lo_j, B); (loc_i, B)→(loc_j, MM); (loc_i, MM)→(loc_j, MM); (loc_i, MM)→(loc_j, B); (loc_im M)→(loc_j, B), where loc_i and loc_j denote location i and location j, respectively.

Figure 15:
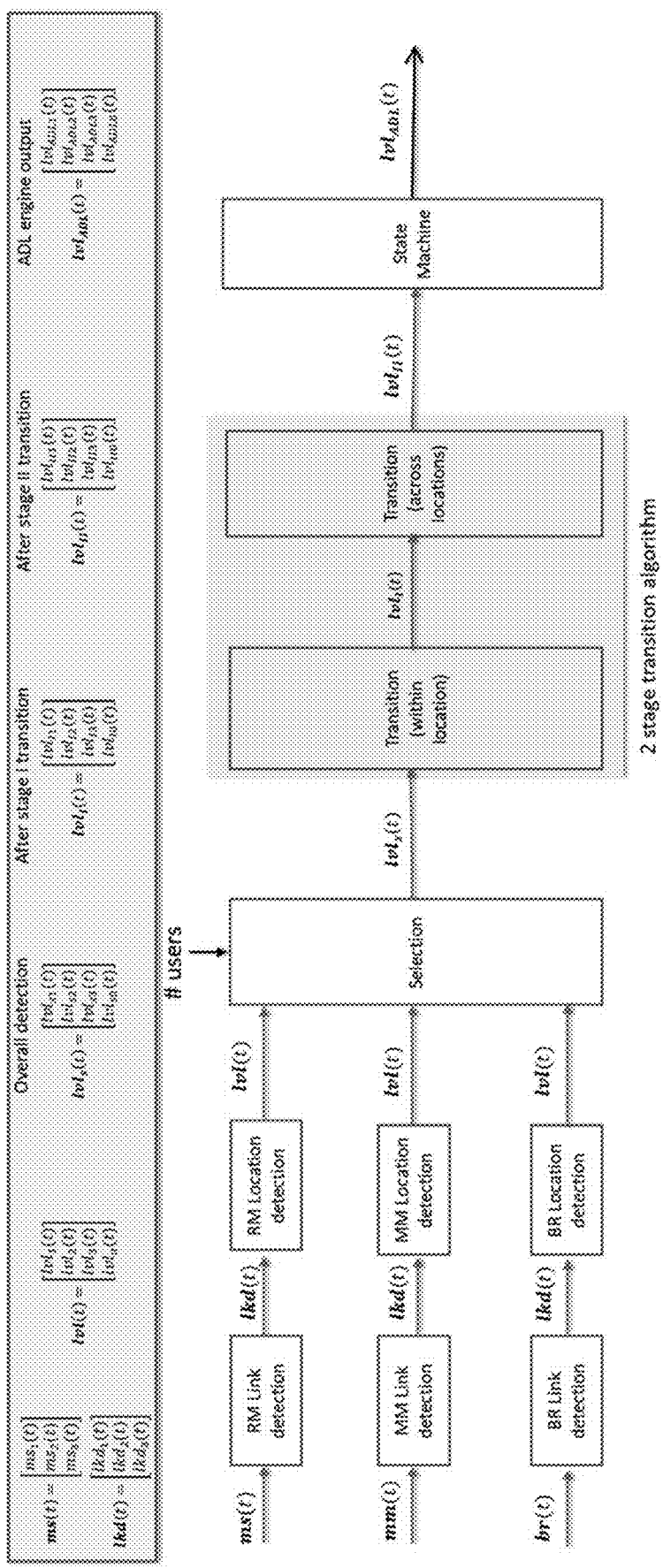
FIG. 15 illustrates an exemplary overview of an ADL (activity of daily living) fusion engine for wireless sensing, according to some embodiments of the present disclosure.
Figure 16:
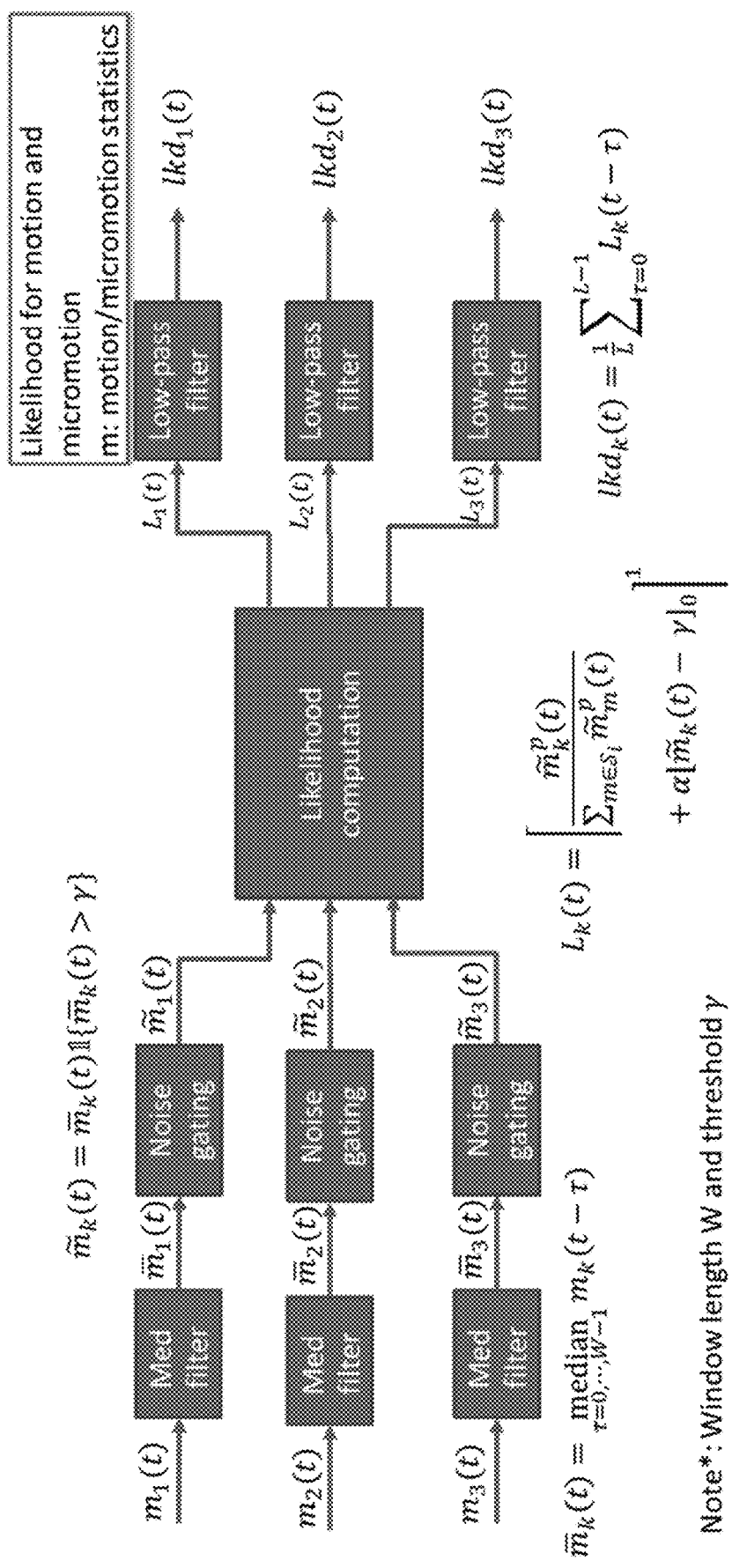
FIGS. 16-17 illustrate exemplary diagrams for link detection of an ADL-based wireless sensing system, according to some embodiments of the present disclosure.
Figure 17:
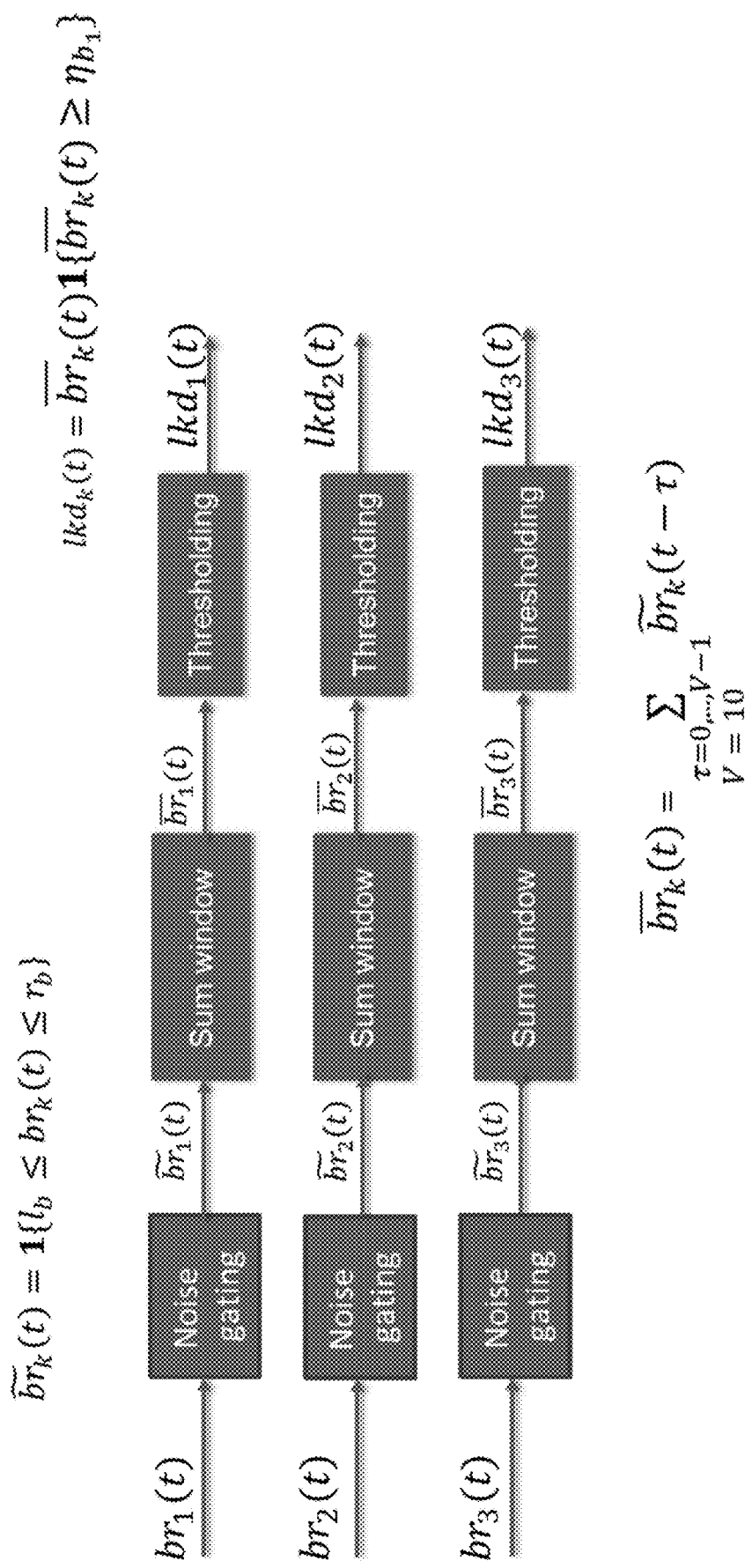

FIG. 15 illustrates an exemplary overview of an ADL (activity of daily living) fusion engine for wireless sensing, assuming there are 3 Bots and 1 Origin used for wireless sensing. FIGS. 16-17 illustrate exemplary diagrams for link detection of an ADL-based wireless sensing system, according to some embodiments of the present disclosure. FIG. 16 shows operation of regular motion (RM) and micro motion (MM) link detection. FIG. 17 shows operation of breathing (BR) link detection.

Figure 18:
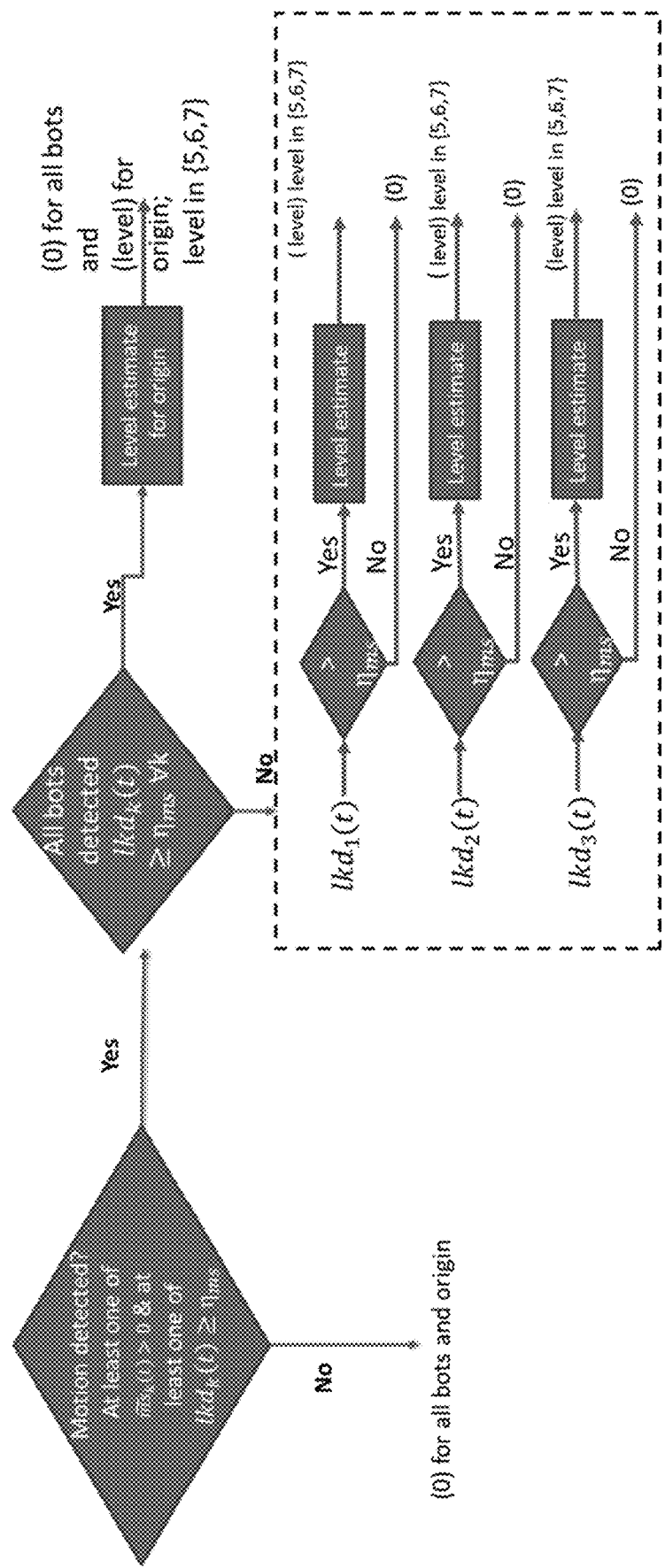
FIGS. 18-21 illustrate exemplary diagrams for location detection of an ADL-based wireless sensing system, according to some embodiments of the present disclosure.
Figure 19:
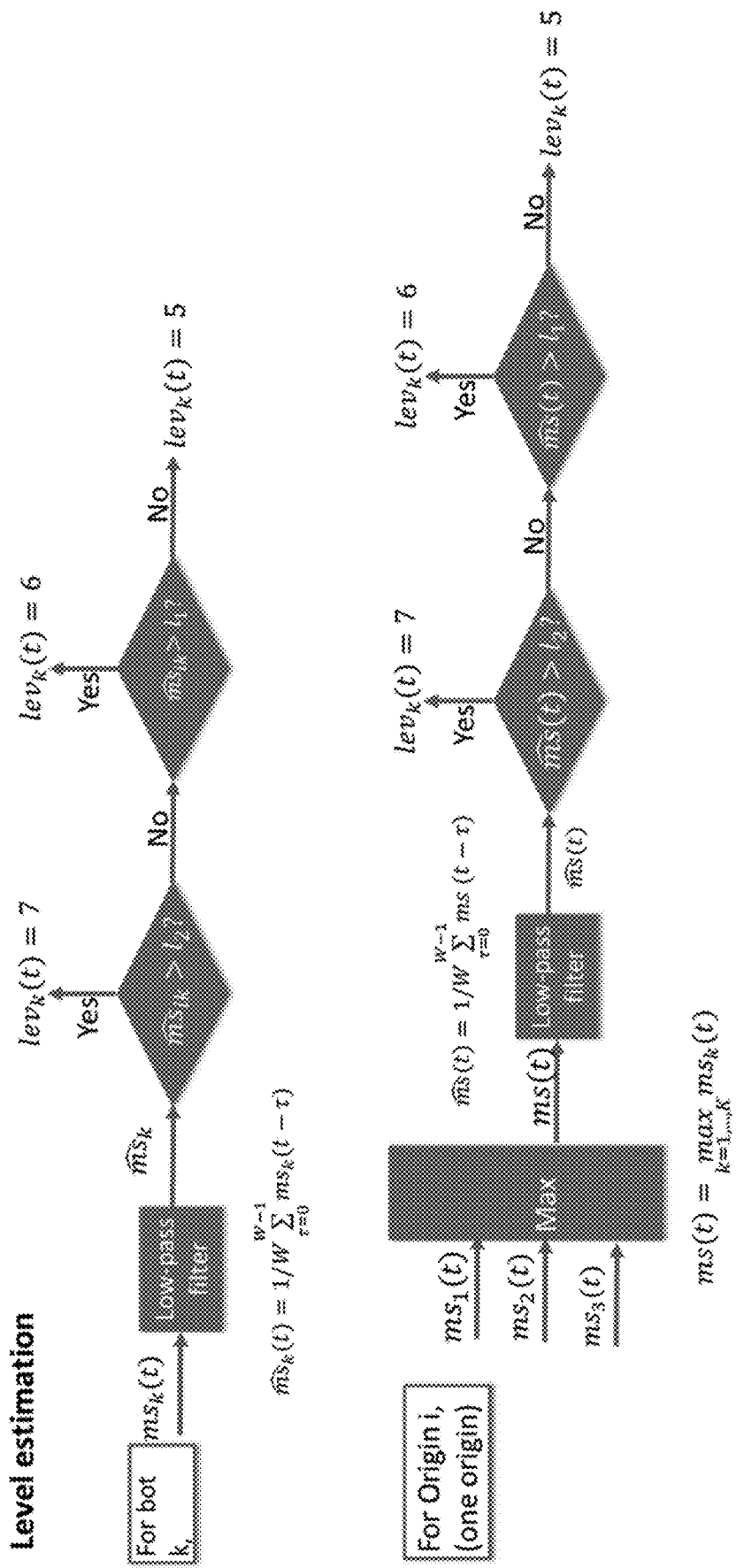
Figure 20:
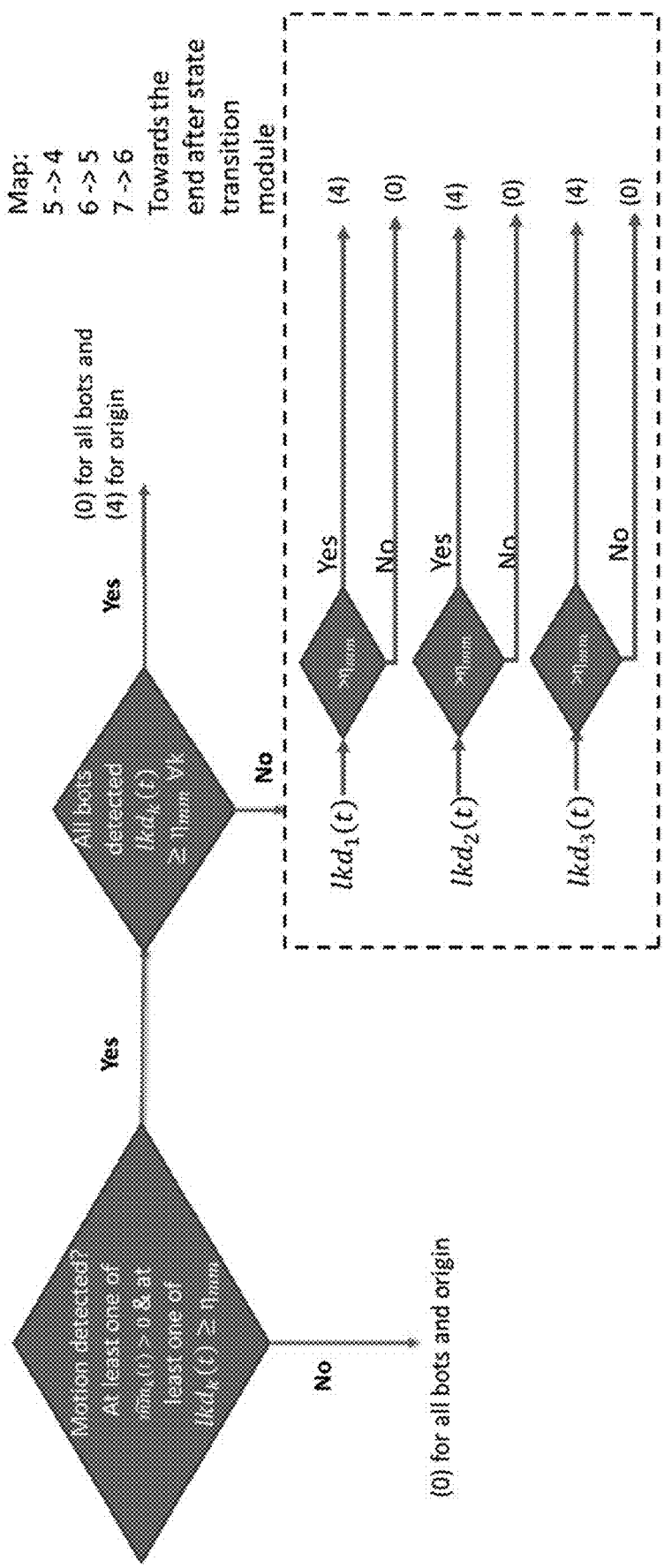
Figure 21:
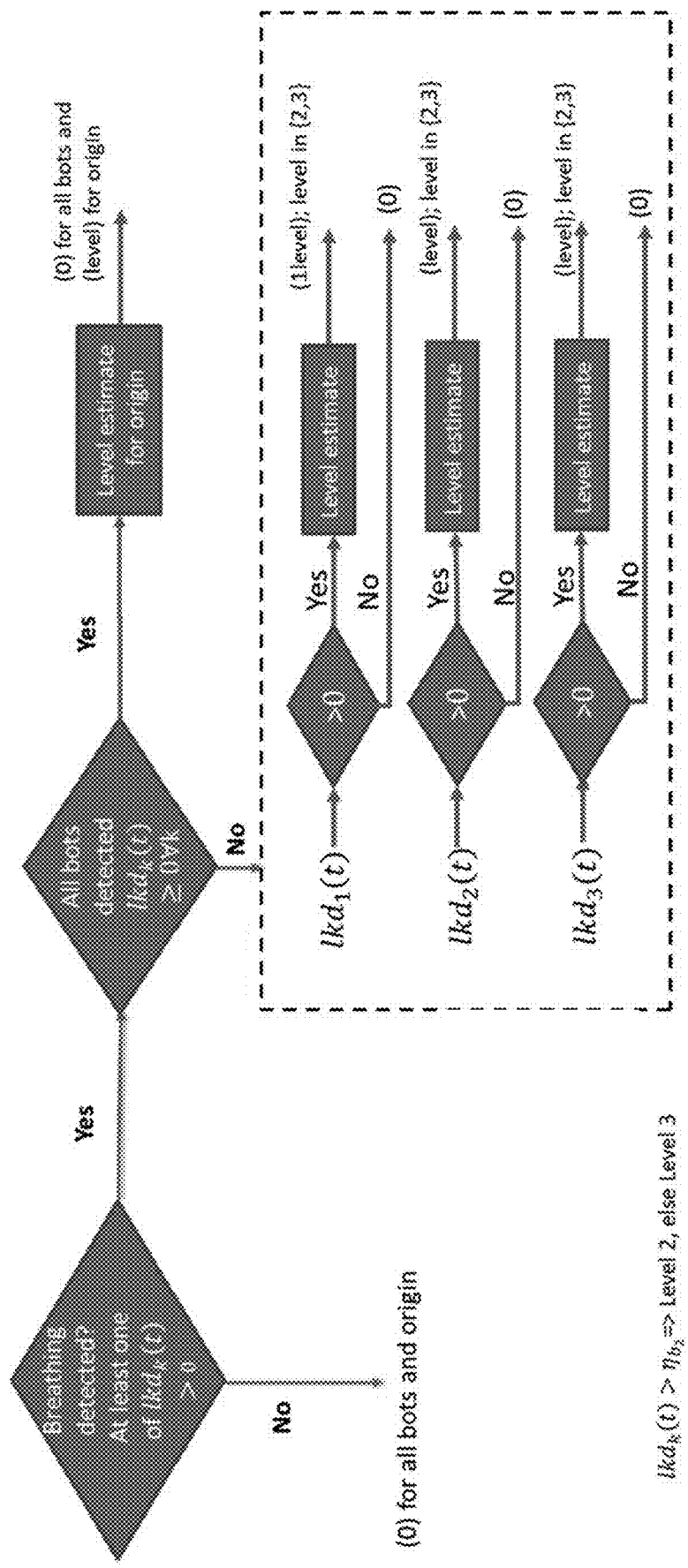
Figure 22:
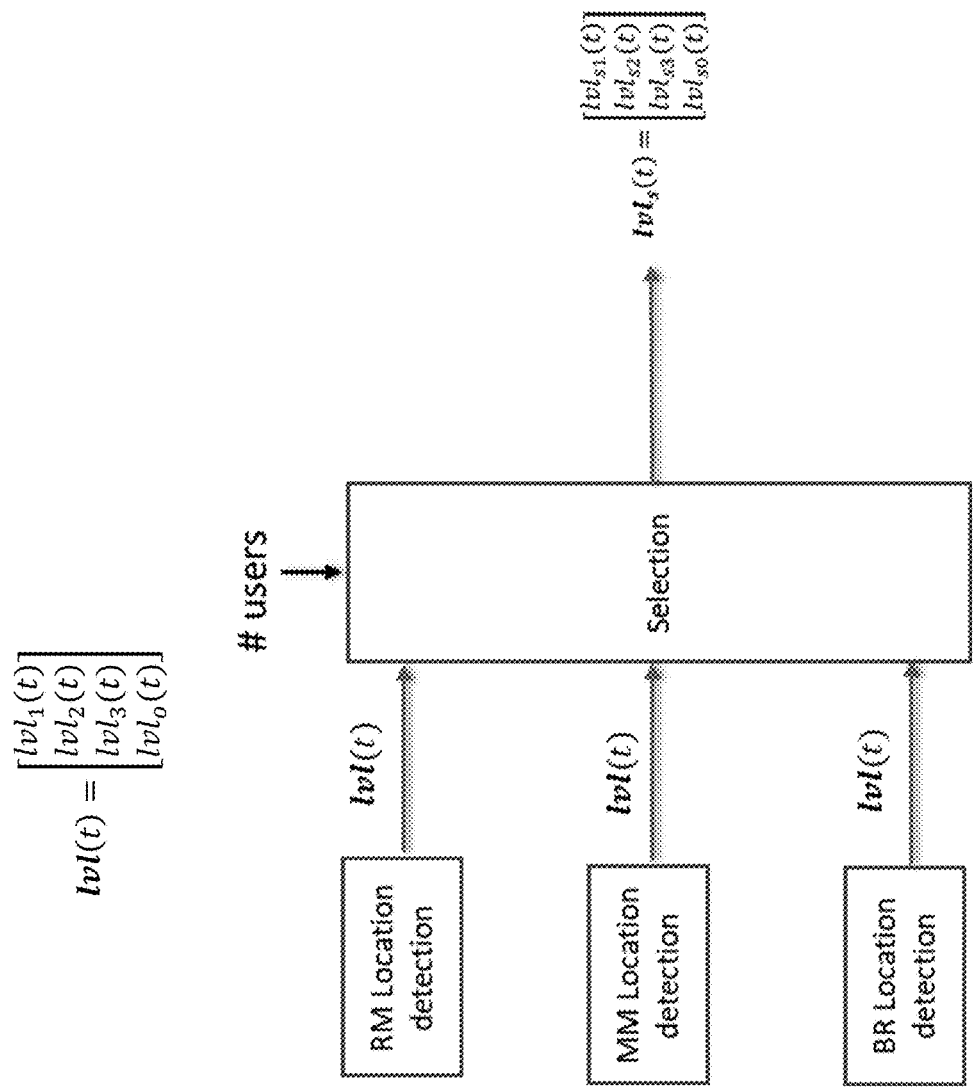
FIG. 22 illustrates an exemplary diagram for selection operation of an ADL-based wireless sensing system, according to some embodiments of the present disclosure.

FIGS. 18-21 illustrate exemplary diagrams for location detection of an ADL-based wireless sensing system, according to some embodiments of the present disclosure. FIGS. 18-19 show operation of RM location detection. FIG. 20 shows operation of MM location detection. FIG. 21 shows operation of BR location detection. FIG. 22 illustrates an exemplary diagram for selection operation of an ADL-based wireless sensing system, according to some embodiments of the present disclosure.

In some embodiments, the present teaching discloses a wireless sensing system that computes a location of and/or a motion of an object in a venue based on TSCI captured in more than one device-links arranged in a star configuration. For example, the center device may be an AP in a WiFi network, or a base station in a mobile communication (e.g. 4G/5G/6G/7G/8G).

In some embodiments, N1+1 wireless devices may form a star configuration in the system, with N1 device-links. Each device-link links two devices wirelessly, with one being Type1 device (transmitter) and the other one being receiver. The device at the center of the star configuration (central device) may function as Type1 in some device-links and function as Type2 in other device-links.

For each of the N1 device-link, the Type1 device sends a wireless signal (sounding signal) to the Type2 device. A TSCI is obtained at the Type2 device. A link-MS may be computed based on the TSCI. The link-MS may be computed locally in the Type2 device, or non-locally in another, or remotely. The link-MS may be transmitted to another of the N1+1 device (e.g. central device), another device, a local server, or a cloud server. Or the TSCI may be reported to the Type1 device (e.g. central device, based on 11bf) and the link-MS may be computed non-locally in the Type1 device. A location of the motion of the object in the venue may be determined based on the N1 link-MS.

The following numbered clauses provide additional examples for wireless sensing.

Clause A1. A method/device/system/software of a wireless sensing system, comprising: configuring N1+1 heterogeneous wireless devices of the wireless sensing system in a venue to form N1 device-links in a star configuration, wherein each device-link comprises two of the devices linked wirelessly, one functioning as a Type1 device (wireless transmitter) and the other one as a Type2 device (wireless receiver), wherein one device is at the central position of the star configuration being in all the N device-links, while each of the remaining N1 devices is at non-central position of the star configuration being linked wirelessly to the central device in one of the N1 device-links, wherein N1>1; transmitting N1 wireless signals through a wireless multipath channel of the venue, with the respective wireless signal transmitted from a respective Type1 device of a respective device-link, wherein the wireless multipath channel is impacted by a motion of an object in the venue; receiving the N1 wireless signals through the wireless multipath channel, with the respective wireless signal received by a respective Type2 device of the respective device-link, wherein the respective received wireless signal differs from the respective transmitted wireless signal due to the wireless multipath channel of the venue and the motion of the object; obtaining N1 time series of channel information (TSCI) of the wireless multipath channel based on the N1 received wireless signals, with the respective TSCI based on the respective received wireless signal of the respective device-link using a respective processor, a respective memory and a respective set of instructions; computing N1 linkwise motion statistics (link-MS) associated with the N1 device-links based on the N1 TSCI, with the respective link-MS associated with the respective device-link computed based on the respective TSCI; computing a location associated with the object based on the N1 link-MS.

The venue may be partitioned into N1+1 regions based on the wireless devices. Each wireless device is associated with a region. The location of the motion of the object in the venue may be computed as any one of the N1+1 regions (which are called "candidate locations") based on the link-MS.

Clause A2. The method/device/system/software of the wireless sensing system of Clause A1, comprising: partitioning the venue into N1+1 regions, wherein each region is a candidate location associated with the object; associating the N1+1 regions with the N1+1 devices, each region with a respective device; computing the location as one of the N1+1 candidate locations based on the N1 link-MS.

Possible link-MS. The link-MS may contain one, or two, or three, or more of these. The link-MS may include 3 items: a motion statistics (TRRS, or a temporal correlation of CI (or a feature of CI), or inner product of two CI vectors (or two vectors of CI features), or a large motion statistics), a micro-motion statistics (a component-wise correlation of CI (or CI feature) aggregated using averaging or weighted averaging, possibly with MRC), a breathing statistics (computed based on a characteristic feature of autocorrelation function of CI). The characteristic feature may be a local maximum.

Clause A3. The method/device/system/software of the wireless sensing system of Clause A2, comprising: wherein each channel information (CI) of a respective TSCI comprises at least one component; wherein a set of link-MS comprises at least one of: motion statistics, large-motion statistics, micro-motion statistics, component-wise motion statistics, breathing statistics, time reversal resonating strength (TRRS), feature, magnitude, phase, power, mean, moving average, median, mode, statistical characteristics, variance, standard deviation, variation, derivative, slope, total variation, absolute variation, square variation, spread, dispersion, variability, deviation, divergence, range, skewness, kurtosis, likelihood, entropy, regularity, similarity, probability distribution function, moment generating function, correlation, cross correlation, auto-correlation, correlation indicator, correlation coefficient, component-wise correlation, a feature of autocorrelation function (ACF), covariance, cross covariance, auto-covariance, component-wise covariance, inner product of two vectors, outer product, dot product, projection, similarity score, distance score, Euclidean distance, absolute distance, graph distance, discrimination score, norm, metric, quality metric, signal quality condition, periodicity, repeatedness, impulsiveness, change, recurrence, period, time, duration, timing, time trend, rhythm, frequency, spectrum, total energy, static energy, temporal minimum of total energy, temporal minimum of total energy with a correction, dynamic energy, difference of total energy or static energy.

How to select the location as one of the N1+1 candidate locations. The location is selected as the central candidate location if a significant majority of the N1 link-MS are each satisfying a selection criterion (e.g. respective link-MS being greater than a second threshold). The significant majority may be expressed as a percentage greater than or equal to a first threshold (e.g. 100%, 90%, 80%, etc.). The location is selected as one of N1 non-central candidate locations if there is no significant majority of the N1 link-MS satisfying the selection criterion. The selected non-central candidate location may be the one whose link-MS is max among all link-MS.

Clause A4. The method/device/system/software of the wireless sensing system of Clause A2, comprising: selecting the location as the central candidate location associated with the central device if: a percentage of all the N1 link-MS associated with all the N1 device-links satisfying a selection criterion is greater than or equal to a first threshold.

Clause A5. The method/device/system/software of the wireless sensing system of Clause A4, comprising: wherein the first threshold is 100%.

Clause A6. The method/device/system/software of the wireless sensing system of Clause A4, comprising: wherein the selection criterion associated with a device link is that the link-MS associated with the device link exceeds a second threshold.

Clause A7. The method/device/system/software of the wireless sensing system of Clause A4, comprising: selecting the location as a particular one of the N1 non-central candidate locations associated with a particular non-central device if: the percentage of all the N1 link-MS associated with all the N1 device-links satisfying the selection criterion is less than the first threshold, and a particular link-MS associated with the particular non-central candidate location satisfies a qualify criterion and also satisfies the selection criterion to a maximum degree, and the particular link-MS satisfies a qualifying criterion.

Clause A8. The method/device/system/software of the wireless sensing system of Clause A7, comprising: wherein the particular link-MS satisfies the selection criterion to the maximum degree if it is a maximum among all the N1 link-MS; wherein the qualifying criterion is that the particular link-MS is greater than a third threshold.

A numerical way to implement the rule-based selection in claims 4 and 7, by computing a single "motion score"/"level" and choosing the candidate location with highest motion score.

Clause A9. The method/device/system/software of the wireless sensing system of claims 2, comprising: computing N1+1 motion scores associated with the N1+1 candidate locations based on the N1 link-MS; selecting the location as a particular candidate location associated with a maximum among the N1+1 motion scores.

How to compute the N1+1 motion scores for the N1+1 candidate locations? One can define at least one default value (e.g. 0) and a set of level values (e.g. {5, 6, 7} for MS, {4, 5, 6} for micro-motion statistics, {2, 3} for breathing) for the motion score. The default value may represent no detection of the object (or the motion of the object) in a candidate location. The level values may span a range of values to reflect a level/degree/significance of the link-MS (e.g. {5, 6, 7} for MS with 5 being smaller MS and 7 being larger MS. If none of link-MS satisfy a selection condition (e.g. link-MS>threshold) nor qualifying condition (e.g. link-MS>another threshold), all the motion scores may be set to default value (e.g. 0). If all link-MS satisfy the selection condition and the qualifying condition, then set motion score to zero for all N1 non-central candidate locations and set motion score to one of the level values for the central candidate location. For each candidate location, if motion score takes on a default value, it may be in IDLE (i.e. no motion) state. If the motion score takes on any value other than a default value, the candidate location may be in MOTION state.

Clause A10. The method/device/system/software of the wireless sensing system of Clause A9, comprising: defining at least one default value and a set of level values for the motion scores, wherein the at least one default value represents an absence (i.e. no or null detection) of the motion of the object, wherein each of the level values of a motion score of a candidate location represents a detection level (or detection degree/significant) of the motion of the object at a candidate location, wherein any default value is smaller than all the level values; if none of the N1 link-MS satisfies a selection criterion and none of the N1 link-MS satisfies a qualifying criterion, setting each of the N1+1 motion scores associated with all the candidate locations to a default value; else if all of the N1 link-MS satisfy the selection criterion and all of the N1 link-MS satisfy the qualifying criterion, setting each of the N1 motion scores associated with the N1 non-central locations to a default value, and setting the motion score associated with the central candidate location to a level value based on an aggregate of the N1 link-MS, wherein the level value is monotonic non-decreasing with respect to the aggregate; else setting each of the N1 motion scores associated with the N1 non-central locations to a respective level value based on the respective link-MS, wherein the respective level value is monotonic non-decreasing with respect to the respective link-MS, and setting the motion score associated with the central candidate location to be a default value; >Selection criterion when link-MS contains two items (e.g. motion statistics+micro motion statistics). The first item may be more important than the second item.

Clause A11. The method/device/system/software of the wireless sensing system of Clause A4, comprising: computing N1 secondary linkwise motion statistics (second link-MS) associated with the N1 device-links based on the N1 TSCI, with the respective second link-MS associated with the respective device-link computed based on the respective TSCI; selecting the location as the central candidate location associated with the central device if: a second percentage of all the N1 second link-MS associated with all the N1 device-links satisfying a second selection criterion is greater than or equal to a fourth threshold.

Clause A12. The method/device/system/software of the wireless sensing system of Clause A11, comprising: wherein the fourth threshold is 100%.

Clause A13. The method/device/system/software of the wireless sensing system of Clause A11, comprising: wherein the second selection criterion associated with a device link is that the second link-MS associated with the device link exceeds a fifth threshold.

Clause A14. The method/device/system/software of the wireless sensing system of Clause A11, comprising: selecting the location as a particular one of the N1 non-central candidate locations associated with a particular non-central device if: the percentage of all the N1 link-MS associated with all the N1 device-links satisfying the selection criterion is less than the first threshold, and the second percentage of all the N1 second link-MS associated with all the N1 device-links satisfying the second selection criterion is less than the fourth threshold, and one of the following two cases is true: (case 1) a particular link-MS associated with the particular non-central candidate location satisfies a qualifying criterion and also satisfies the selection criterion to a maximum degree, or (case 2) none of the N1 link-MS satisfies the qualifying criterion but a particular second link-MS associated with the particular non-central candidate location satisfies a second qualifying criterion and also satisfies the second selection criterion to a second maximum degree.

Clause A15. The method/device/system/software of the wireless sensing system of Clause A14, comprising: wherein the particular link-MS satisfies the selection criterion to the maximum degree if it is a maximum among all the N1 link-MS; wherein the particular second link-MS satisfies the second selection criterion to the second maximum degree if it is a maximum among all the N1 second link-MS; wherein the qualifying criterion is that the particular link-MS is within a qualifying range; wherein the second qualifying criterion is that the particular second link-MS is within a second qualifying range.

There are both link-MS (e.g. motion statistics) and second link-MS (micro-motion statistics). Same default value (e.g. 0) to represent detection. Two sets (first set and second set) of level values for the motion score. First set (e.g. {5, 6, 7} for motion statistics) is more dominant than second set ({4, 5, 6} for micro-motion statistics). The default value may represent no detection of the object (or the motion of the object) in a candidate location. The level values may span a range of values to reflect a level/degree/significance of the link-MS (e.g. {5, 6, 7} for MS with 5 being smaller MS and 7 being larger MS. If none of link-MS satisfy a selection condition (e.g. link-MS>threshold) nor qualifying condition (e.g. link-MS>another threshold), all the motion scores may be set to default value (e.g. 0). If all link-MS satisfy the selection condition and the qualifying condition, then set motion score to zero for all N1 non-central candidate locations and set motion score to one of the level values for the central candidate location.

Clause A16. The method/device/system/software of the wireless sensing system of Clause A9, comprising: computing N1 secondary linkwise motion statistics (second link-MS) associated with the N1 device-links based on the N1 TSCI, with the respective second link-MS associated with the respective device-link computed based on the respective TSCI; defining at least one default value, a first set of level values and a second set of level values for the motion scores, wherein the at least one default value represents an absence (i.e. no or null detection) of the motion of the object, wherein each level value in the first set represents a detection level (or detection degree/significant) of the motion of the object based on a link-MS at a candidate location, wherein each level value in the second set represents a detection level (or detection degree/significant) of the motion of the object based on the respective second link-MS at a candidate location, wherein any default value is smaller than all the level values, wherein each level value in the first set is greater than or equal to all level values in the second set; (note: first set is more "dominant" than the second set) if none of the N1 link-MS satisfies a selection criterion nor a qualifying criterion, and none of the N1 second link-MS satisfies a second selection criterion nor a second qualifying criterion, then (note: no detection) setting each of the N1+1 motion scores associated with all the candidate locations to a default value; else if all of the N1 link-MS satisfy the selection criterion and all of the N1 link-MS satisfy the qualifying criterion, then setting each of the N1 motion scores associated with the N1 non-central locations to a default value, and setting the motion score associated with the central candidate location to a level value in the first set based on an aggregate of the N1 link-MS, wherein the level value in the first set is monotonic non-decreasing with respect to the aggregate; else if all of the N1 second link-MS satisfy the second selection criterion and all of the N1 second link-MS satisfy the second qualifying criterion, then setting each of the N1 motion scores associated with the N1 non-central locations to a default value, and setting the motion score associated with the central candidate location to a level value in the second set based on a second aggregate of the N1 second link-MS, wherein the level value is monotonic non-decreasing with respect to the second aggregate; if the respective link-MS satisfies the selection criterion and the qualifying criterion, then setting the respective motion score to a level value in the first set based on the respective link-MS, wherein the respective level value is monotonic non-decreasing with respect to the respective link-MS; else if the respective second link-MS satisfies the second selection criterion and the second qualifying criterion, then setting the respective motion score to a level value in the second set based on the respective second link-MS, wherein the respective level value in the second set is monotonic non-decreasing with respect to the respective second link-MS; else setting the respective motion score to a default value.

For each candidate location, if motion score takes on a default value, it may be in IDLE (i.e. no motion) state. If the motion score takes on any value other than a default value, the candidate location may be in MOTION state. If the object motion is not detected at all the candidate locations such that all motion scores take on a default value, the system may be in IDLE state. If the object motion is detected at at least one candidate location, the system may be in MOTION state. At any moment, a per-location state called "current" state or per-location motion score called "current" motion score may be maintained like a state variable for each candidate location. The name "current" could have been "immediate past" or "latest". Alternatively a per-location state history or a per-location motion score history (e.g. N recent states or motion scores in N recent sampling instances) may be maintained for each candidate location. At the next moment, the newly computed motion score (called "next" motion score) and the implied state (called "next" state) may be unreliable due to noise or interference. Some smoothing/checking may be needed before the next state or next motion score is used to update the current motion score or current state. Some smoothing to suppress the noisy or interference effects. If the system is currently in IDLE state, but there has been a considerable/increasing sign of motion recently (e.g. consistent and/or considerable number of recent detection, such as percentage of detection >10% in recent 30 seconds, or percentage of detection>20% in recent 20 seconds) and the next motion score of a particular candidate location is not default value (i.e. object motion detected at the particular candidate location), then the next motion score may be considered trustworthy and may be used to update the "current" motion score of the particular candidate location. Otherwise, the next motion score may be considered not trustworthy and may be replaced by a default value before being used to update the "current" motion score of the particular candidate location. If the system is currently in MOTION state, but there has been signs of decreasing motion activity (e.g. consistent and/or considerably less number of recent detection, such as percentage of detection<50% in recent 30 seconds, or percentage of detection <30% in recent 20 seconds), then the next motion score of the candidate location (regardless what value it takes on) may be forced/changed to be a default value to indicate no object motion is detected at the candidate location.

Clause A17. The method/device/system/software of the wireless sensing system of Clause A9, comprising: for each candidate location: in the case that the system is in a IDLE state: if (a) a first percentage of detection of the motion of the object by the system in a first time period is greater than a first threshold and (b) the motion score of the candidate location (the "next" motion score) is greater than the at least one default value, then updating a current motion score of the candidate location to be the motion score, else updating the current motion score of the candidate location to be a default value; in the case that the system is in a MOTION state: if a second percentage of detection of the motion of the object at the candidate location in a second time period is less than a second threshold, then updating the current motion score of the candidate location to be a default value, else updating the current motion score of the candidate location to be the motion score.

A "reliable" or trustworthy detection of object motion may be achieved if the percentage of detection of the object motion exceeds a threshold in a period of time (e.g. detection percentage>40% in 1 minute). If all the candidate locations do not have reliable detection at time t (suggesting no detected motion at time t).

Clause A18. The method/device/system/software of the wireless sensing system of Clause A9, comprising: wherein a candidate location has reliable detection at a time t if a percentage of detection of the motion of the object in an immediate past period of time exceeds a threshold; in the case that none of the candidate locations has reliable detection at time t: if at least one candidate location has reliable detection at least one time instance in a time window, then detecting the motion of the object at a particular candidate location with the largest motion score in the time window, setting the motion score of the particular candidate location at time t to be the largest motion score, setting the motion scores of all remaining candidate locations at time t to a default value; else the motion of the objected is not detected at time t, setting the motion score of each the candidate locations at time t to a default value; in the case that at least one candidate location has reliable detection at time t: sorting the candidate locations in a descending order of the motion scores in a time window; for each candidate location: if the candidate location has reliable detection at time t, then update the current motion score with the motion score; else if there is at least one detection in the immediate past time period, then update the current motion score with the motion score; else setting the current motion score to be a default value; detecting the motion of the object at a particular candidate location with the largest sorted motion score in the time window; setting the motion score of the particular candidate location at time t to be the largest motion score.

Clause A19. The method/device/system/software of the wireless sensing system of Clause A18, comprising: wherein there are total of N2 objects in the venue; in the case that none of the candidate locations has reliable detection at time t: if at least N2 candidate locations have reliable detection at at least one time instance in the time window, then detecting the motion of the N2 objects at the N2 candidate locations with the N2 largest motion scores in the time window, setting the motion score of the N2 candidate location at time t to be the N2 largest motion scores, setting the motion scores of all remaining candidate locations at time t to a default value; In the case that at least one candidate location has reliable detection at time t: detecting the motion of the N2 objects at N2 candidate locations with the N2 largest sorted motion score in the time window; setting the motion score of the N2 candidate location at time t to be the largest motion score.

Possible (link-MS, second link-MS) pairs.

Clause A20. The method/device/system/software of the wireless sensing system of Clause A11, comprising: wherein the (link-MS, second link-MS) pair comprises one of the following pairs: (large motion statistics, micro motion statistics), (RM, MM), (MS, MM), (correlation, component-wise correlation), (correlation, aggregate of component-wise correlation), (correlation of CI vectors, aggregate of correlation of CI components), (inner-product of CI vectors, aggregate of correlation of CI components with MRC), (TRRS, breathing statistics), (correlation of CI vectors, breathing rate), (inner product of CI vectors, breathing indicator), (correction of CI vectors, breathing detector), (micro motion statistics, breathing statistics).

Clause A21. The method/device/system/software of the wireless sensing system of Clause A9, comprising: computing N1+1 tentative scores associated with the N1+1 candidate locations based on the N1 link-MS, each first tentative score taking on a value from a first range of values; computing N1+1 second tentative scores associated with the N1+1 candidate locations based on the N1 second link-MS, each second tentative score taking on a value from a second range of values; computing the N1+1 motion scores based on the N1+1 tentative scores and the N1+1 second tentative scores.

Clause A22. The method/device/system/software of the wireless sensing system of Clause A11, comprising: computing N1 third linkwise motion statistics (third link-MS) associated with the N1 device-links based on the N1 TSCI, with the respective third link-MS associated with the respective device-link computed based on the respective TSCI; selecting the location as the central candidate location associated with the central device if: a third percentage of all the N1 third link-MS associated with all the N1 device-links satisfying a third selection criterion is greater than or equal to a seventh threshold.

Clause A23. The method/device/system/software of the wireless sensing system of Clause A22, comprising: selecting the location as a particular one of the N1 non-central candidate locations associated with a particular non-central device if: the percentage of all the N1 link-MS associated with all the N1 device-links satisfying the selection criterion is less than the first threshold, and the second percentage of all the N1 second link-MS associated with all the N1 device-links satisfying the second selection criterion is less than the fourth threshold, and the third percentage of all the N1 third link-MS associated with all the N1 device-links satisfying the third selection criterion is less than the seventh threshold, and one of the following three cases is true: (case 1) a particular link-MS associated with the particular non-central candidate location satisfies a qualifying criterion and also satisfies the selection criterion to a maximum degree, or (case 2) none of the N1 link-MS satisfies the qualifying criterion but a particular second link-MS associated with the particular non-central candidate location satisfies the second qualifying criterion and also satisfies the second selection criterion to a second maximum degree, or (case 3) none of the N1 link-MS satisfies the qualifying criterion, and none of the N1 second link-MS satisfies the second qualifying criterion, but a particular third link-MS associated with the particular non-central candidate location satisfies the third qualifying criterion and also satisfies the third selection criterion to a third maximum degree.

Clause A24. The method/device/system/software of the wireless sensing system of Clause A23, comprising: wherein the link-MS comprises a TRRS; wherein the second link-MS comprises a micro-motion statistics; wherein the third link-MS comprises a breathing statistics.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method of a wireless sensing system, comprising:
   determining a plurality of heterogeneous wireless devices of the wireless sensing system in a venue;
   determining a plurality of device-links each of which comprises two of the heterogeneous wireless devices, wherein one of the two heterogeneous wireless devices functions as a transmitter and the other one of the two heterogeneous wireless devices functions as a receiver;
   for each respective device-link of the plurality of device-links,
      transmitting a respective wireless signal from a respective transmitter of the respective device-link through a wireless multipath channel of the venue, wherein the wireless multipath channel is impacted by a motion of an object in the venue,
      receiving the respective wireless signal by a respective receiver of the respective device-link through the wireless multipath channel, wherein the respective received wireless signal differs from the respective transmitted wireless signal due to the wireless multipath channel of the venue and the motion of the object,
      obtaining a respective time series of channel information (TSCI) of the wireless multipath channel based on the respective received wireless signal of the respective device-link, wherein each channel information comprises one of: channel state information (CSI), channel impulse response (CIR), or channel frequency response (CFR), and
      computing a respective linkwise motion statistics (link-MS) for the respective device-link based on the respective TSCI, wherein the respective link-MS is computed based on: (i) a similarity score between a pair of temporally adjacent CI of the respective TSCI, (ii) an autocorrelation function (ACF) of the respective TSCI, and (iii) a characteristics of the ACF;
   performing a sensing task associated with the motion of the object based on at least one of: all the TSCI or all the link-MS;
   determining a number of candidate locations, each candidate location being associated with a respective heterogeneous wireless device;
   computing a respective location-wise motion statistics (loc-MS) for each respective candidate location based on respective multiple link-MS, wherein for each respective candidate location associated with the respective heterogeneous wireless device:
      the respective loc-MS comprises a respective weighted sum or a respective weighted product of a respective plurality of link-based quantities, each respective link-based quantity associated with a respective device-link and a respective weight,
      the respective weight is positive when the respective device-link is in a respective first group comprising device-links at a device-link-distance less than or equal to k1 from the respective device associated with the respective candidate location, and is negative when the respective device-link is in a respective second group comprising device-links at a device-link-distance greater than or equal to k2 from the respective device associated with the respective candidate location, k1 being an integer, k2 being an integer greater than k1, each of the respective plurality of link-based quantities is a univariate monotonic function of the respective link-MS associated with the respective device-link;

analyzing the number of loc-MS and the plurality of link-MS; and computing a location in the venue associated with the sensing task based on the analyzing of all the link-MS and the loc-MS.

2. The method of claim 1, wherein:
the respective link-MS comprises at least one of: time reversal resonating strength (TRRS), correlation, cross-correlation, autocorrelation, inner product, or dot product; and the respective plurality of link-based quantities are normalized such that their sum is equal to one.

3. The method of claim 2, further comprising:
preprocessing the respective TSCI; and
smoothing the respective link-MS over time based on a smoothing filter.

4. The method of claim 3, further comprising:
applying a correction to a particular link-MS associated with a particular device-link of the plurality of device-links based on a characteristics of the transmitter, the receiver, and the wireless signal associated with the particular device-link, wherein the correction is predetermined or adaptively determined.

5. The method of claim 4, further comprising:
obtaining multiple TSCI of the wireless multipath channel based on a first received wireless signal of a first device-link of the plurality of device-links, wherein at least one of the transmitter or the receiver associated with the first device-link comprises multiple antennas;

computing multiple first candidate link-MS based on the multiple TSCI, wherein each first candidate link-MS is computed based on a respective one of the multiple TSCI; and aggregating the multiple first candidate link-MS to compute a first link-MS associated with the first device-link, using a maximum ratio combining (MRC) scheme.

6. The method of claim 5, wherein:
each channel information (CI) of a particular TSCI associated with a second device-link the plurality of device-links comprises multiple components;
the method further comprises:
computing multiple second candidate link-MS based on multiple components of each CI of the particular TSCI, and
aggregating the multiple second candidate link-MS to compute a second link-MS for the second device-link based on the particular TSCI, using a maximum ratio combining (MRC) scheme.

7. The method of claim 6, further comprising:
partitioning the venue into a plurality of regions, wherein each region is a candidate location associated with the sensing task;
associating each region with one of the heterogeneous wireless devices; and
computing the location associated with the sensing task as one of the plurality of candidate locations.

8. The method of claim 7, further comprising:
computing a measurement value based on a measure for each of the plurality of loc-MS; and
detecting a target associated with the sensing task when at least one of the plurality of loc-MS has a measurement value greater than a first threshold.

9. The method of claim 8, further comprising:
computing the location of the target as a candidate location whose loc-MS has a maximum measurement value among the plurality of loc-MS.

10. The method of claim 9, further comprising:
removing the location of the target from the plurality of candidate locations to obtain remaining candidate locations;
detecting a second target associated with the sensing task when at least one loc-MS associated with the remaining candidate locations has a measurement value greater than a second threshold; and
computing a second location of the second target as one of the remaining candidate locations whose loc-MS has a maximum measurement value among all loc-MS associated with the remaining candidate locations.

11. The method of claim 10, wherein each loc-MS comprises at least one of:
a sum, a weighted sum, a product, a weighted product, an average, a median, a weighted sum of a function, or a weighted product of the function.

12. The method of claim 11, further comprising:
for a particular candidate location associated with a particular heterogeneous wireless device:
partitioning all of the plurality of device-links into a first group and a second group, and
computing the loc-MS for the particular candidate location based on a weighted sum of all the link-MS or a weighted product of all the link-MS, such that a first weight for each link-MS associated with the first group is greater than a second weight for any link-MS associated with the second group.

13. The method of claim 12, further comprising:
for the particular candidate location, computing the loc-MS for the particular candidate location with a positive weight for each link-MS associated with the first group and a negative weight for each link-MS associated with the second group.

14. The method of claim 13, wherein:
the first group comprises any device-link of which one of the transmitter or the receiver is the particular heterogeneous wireless device.

15. The method of claim 14, wherein:
the first group comprises any distance-k device-link for the particular candidate location, where k is an integer less than or equal to k1;
the particular device associated with the particular candidate location is considered a distance-0 device for the particular candidate location;
a distance-1 device-link is a device-link of which one of the transmitter or the receiver is the distance-0 device, the other one of the transmitter or the receiver of the distance-1 device link is considered a distance-1 device for the particular candidate location;
the device-link-distance of any distance-1 device-link is 1 from the particular device;
a distance-k device-link is an additional device link of which one of the transmitter or the receiver is a distance-(k−1) device for the particular candidate location, and the other one of the transmitter or the receiver is not a distance-(k−2) device;

the other one of the transmitter or the receiver of the distance-k device link is considered a distance-k device for the particular candidate location; and the device-link-distance of any distance-k device-link from the particular device is computed as the device-link-distance of the distance-(k−1) device plus 1.

16. The method of claim 15, wherein:

the first group comprises distance-1 device links and distance-2 device links; and a respective weight for a distance-1 device-link is greater than or equal to a respective weight for a distance-2 device-link.

17. The method of claim 16, wherein:

the first group further recursively comprises any additional device-link of which one of the transmitter or the receiver is a distance-k3 device for the particular candidate location, and the other one of the transmitter or the receiver is considered a distance-(k3+1) device for the particular candidate location.

18. The method of claim 17, wherein:

a weight for a distance-k3 device-link is greater than or equal to a weight for a distance-(k3+1) device-link.

19. The method of claim 18, wherein:

two device-links are associated with two particular heterogeneous wireless devices such that wireless signals are sent in both directions between the two particular heterogeneous wireless devices, and TSCI are obtained at both of the two particular heterogeneous wireless devices; and the two link-MS associated with the two device-links have identical weights in the computation of the loc-MS for the particular candidate location.

20. The method of claim 19, further comprising:

replacing the two link-MS by a single link-MS which is equal to an aggregation of the two link-MS in the computation of the loc-MS for the particular candidate location.

21. The method of claim 20, further comprising:

comparing a first collection of all the device-links in the wireless sensing system with a second collection of all possible device-links in a fully-connected configuration of the plurality of heterogeneous wireless devices;

determining at least one missing device-link which is a device-link present in the second collection but absent in the first collection; and applying a correction to the weights of the device-links in the first collection in the computation of the loc-MS, based on a hypothetical weight for each missing device-link.

22. A system for wireless sensing, comprising:

a plurality of heterogeneous wireless devices forming a plurality of device-links in a venue, wherein each of the plurality of device-links comprises two of the heterogeneous wireless devices, wherein one of the two heterogeneous wireless devices functions as a transmitter and the other one of the two heterogeneous wireless devices functions as a receiver; and at least one processor, wherein for each respective device-link of the plurality of device-links:

a respective transmitter of the respective device-link is configured to transmit a respective wireless signal through a wireless multipath channel of the venue, the wireless multipath channel is impacted by a motion of an object in the venue, a respective receiver of the respective device-link is configured to receive the respective wireless signal through the wireless multipath channel, the respective received wireless signal differs from the respective transmitted wireless signal due to the wireless multipath channel of the venue and the motion of the object, the at least one processor is configured to obtain a respective time series of channel information (TSCI) of the wireless multipath channel based on the respective received wireless signal of the respective device-link, and to compute a respective linkwise motion statistics (link-MS) for the respective device-link based on the respective TSCI, each channel information comprises one of: channel state information (CSI), channel impulse response (CIR), or channel frequency response (CFR), the respective link-MS is computed based on: (i) a similarity score between a pair of temporally adjacent CI of the respective TSCI, (ii) an autocorrelation function (ACF) of the respective TSCI, and (iii) a characteristics of the ACF, wherein the at least one processor is further configured for:

performing a sensing task associated with the motion of the object based on at least one of: all the TSCI or all the link-MS, determining a number of candidate locations, each candidate location being associated with a respective heterogeneous wireless device, computing a respective location-wise motion statistics (loc-MS) for each respective candidate location based on respective multiple link-MS, wherein for each respective candidate location associated with the respective heterogeneous wireless device:

the respective loc-MS comprises a respective weighted sum or a respective weighted product of a respective plurality of link-based quantities, each respective link-based quantity associated with a respective device-link and a respective weight, the respective weight is positive when the respective device-link is in a respective first group comprising device-links at a device-link-distance less than or equal to k1 from the respective device associated with the respective candidate location, and is negative when the respective device-link is in a respective second group comprising device-links at a device-link-distance greater than or equal to k2 from the respective device associated with the respective candidate location, k1 being an integer, k2 being an integer greater than k1, each of the respective plurality of link-based quantities is a univariate monotonic function of the respective link-MS associated with the respective device-link, analyzing the number of loc-MS and the plurality of link-MS, and computing a location in the venue associated with the sensing task based on the analyzing of all the link-MS and the loc-MS.

* * * * *